(12) United States Patent
Yip et al.

(10) Patent No.: US 7,590,669 B2
(45) Date of Patent: Sep. 15, 2009

(54) MANAGING CLIENT CONFIGURATION DATA

(75) Inventors: Ying-Kin Tony Yip, Kirkland, WA (US); Kok Wai Chan, Bellevue, WA (US); Rui Chen, Kirkland, WA (US); Rahul Shrikant Newaskar, Bellevue, WA (US); Anthony Toivonen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 10/819,834

(22) Filed: Apr. 6, 2004

(65) Prior Publication Data

US 2005/0234931 A1 Oct. 20, 2005

(51) Int. Cl.
G06F 12/00 (2006.01)
G06F 17/30 (2006.01)

(52) U.S. Cl. ............................. 707/203; 707/2; 707/3; 707/5; 707/9; 707/10; 707/202; 707/204; 709/222; 709/223; 709/224; 713/100

(58) Field of Classification Search ................. 709/223, 709/224
See application file for complete search history.

(56) References Cited

U.S. PATENT DOCUMENTS

| | | | |
|---|---|---|---|
| 5,838,918 A | 11/1998 | Prager et al. | |
| 6,259,448 B1 | 7/2001 | McNally et al. | |
| 6,308,208 B1 | 10/2001 | Jung et al. | |
| 6,477,572 B1 | 11/2002 | Elderton et al. | |
| 6,480,955 B1 * | 11/2002 | DeKoning et al. | ........... 713/100 |
| 6,549,932 B1 | 4/2003 | McNally et al. | |
| 6,553,403 B1 | 4/2003 | Jarriel et al. | |
| 6,584,499 B1 * | 6/2003 | Jantz et al. | ................... 709/220 |
| 6,594,786 B1 * | 7/2003 | Connelly et al. | ............... 714/50 |
| 6,662,205 B1 | 12/2003 | Bereiter | |
| 6,871,279 B2 | 3/2005 | Sames et al. | |
| 6,931,523 B1 * | 8/2005 | Tomoson et al. | ............ 713/100 |
| 6,985,955 B2 | 1/2006 | Gullotta et al. | |
| 7,010,718 B2 * | 3/2006 | Ogawa et al. | ................... 714/4 |
| 7,020,696 B1 * | 3/2006 | Perry et al. | .................. 709/223 |
| 7,020,697 B1 * | 3/2006 | Goodman et al. | ........... 709/223 |
| 7,073,195 B2 | 7/2006 | Brickell et al. | |
| 7,127,460 B2 | 10/2006 | Nixon et al. | |
| 2003/0009552 A1 | 1/2003 | Benfield et al. | |
| 2003/0009553 A1 * | 1/2003 | Benfield et al. | ............. 709/224 |

(Continued)

OTHER PUBLICATIONS

Subramanyan et al., "A Scalable SNMP-Based Distributed Monitoring System for Heterogeneous Network Computing," Proceedings of the 2000 ACM/IEEE Conference on Supercomputing (CDROM), 2000, pp. 1-9, Article No. 14, IEEE Computer Society, Washington, D.C, USA.

(Continued)

*Primary Examiner*—Hosain T Alam
*Assistant Examiner*—Usmaan Saeed
(74) *Attorney, Agent, or Firm*—Senniger Powers LLP

(57) ABSTRACT

Method for providing an interface to a function that manages a plurality of entities. Computer-executable instructions receive a request to implement a change in configuration data. The configuration data is stored in a memory area and relates to an operation of one or more entities. In response to the received request, computer-executable instructions identify a plurality of the entities affected by the change and implement the change for the identified plurality of entities in accordance with the function.

21 Claims, 12 Drawing Sheets

U.S. PATENT DOCUMENTS

2003/0149756 A1* 8/2003 Grieve et al. ............. 709/223
2004/0031030 A1* 2/2004 Kidder et al. ............. 717/172
2004/0059813 A1* 3/2004 Bolder et al. ............. 709/224
2005/0071754 A1  3/2005 Morgan et al.

OTHER PUBLICATIONS

Lutfiyya et al., "Configuration Maintenance for Distributed Applications Management," Proceedings of the 1997 Conference of the Centre for Advanced Studies on Collaborative Research, 1997, pp. 1-15, IBM Press, Canada.

Kahani et al., "Decentralised Approaches for Network Management," ACM SIGCOMM Computer Communication Review, Jul. 1997, pp. 36-47, vol. 27, Issue 3, ACM Press, New York, USA.

Goldszmidt et al., "Network Management by Delegation: the MAD Approach," Proceedings of the 1991 Conference of the Centre for Advanced Studies on Collaborative Research, 1991, pp. 347-361, IBM Press, Canada.

* cited by examiner

100

700

900

MANAGING CLIENT CONFIGURATION DATA

CROSS REFERENCE TO RELATED APPLICATIONS

This application is related to a co-pending U.S. patent application entitled "CENTRALIZED CONFIGURATION DATA MANAGEMENT FOR DISTRIBUTED CLIENTS" filed Apr. 6, 2004, Ser. No. 10/820,181, which is incorporated herein by reference in its entirety.

TECHNICAL FIELD

Embodiments of the present invention relate to the field of managing a plurality of clients. In particular, embodiments of the present invention relate to managing configuration data of a client, wherein the configuration data defines an operation of the client.

BACKGROUND OF THE INVENTION

In existing network environments, managing a client (e.g., a server, service, application program, or operating system component) involves managing configuration data stored on the client. In one example, a large number of different servers often host a variety of different services (e.g., web services, soap services, and/or operating system services). A server hosting a particular service usually stores thereon configuration data (e.g., software settings, operational parameters, service uniform resource locators (URLs), data retention policies, and site properties). Such configuration data defines an operation of the server in hosting the particular service. For example, the configuration data may determine an operational state of the server (i.e., whether the server is executing a service) as well as when and how a service is executed on the server.

As the network environment grows increasingly larger, managing or organizing a relationship among different clients and/or configuration data also becomes an increasingly complex task. For example, there may be a number of service classes, wherein a service class defines a set of services executable on a particular server (e.g., registration service and member center service may be part of the same service class). A group of servers may also be defined to execute one or more services belonging to a particular service class. Accordingly, servers belonging to this group of servers may share certain configuration data and other settings in order to provide a uniform and integrated service. As can be seen, managing configuration data (e.g., changing/overriding, adding/removing, and viewing the configuration data) across different server groups or service classes can be a challenging task.

In prior methods, managing configuration data involves manually managing the configuration data of a particular client. For example, in prior methods, an administrator would change configuration data by manually identifying one or more clients affected by a change in the configuration data and then manually updating the configuration data in the identified clients one by one. Such prior methods create substantial operational problems for network administrators. First, a large number of files, data access methods, and tools are frequently needed to manipulate configuration data across different clients. This results in a difficulty to track, schedule, and execute configuration data changes and requires a great understanding of the network environment in order to identify the affected clients. Second, the prior methods do not have a simple way to select a large group of clients, schedule a one-time or recurring configuration data change, and then uniformly apply the configuration data change to the large group of clients. In particular, managing clients and performing configuration data changes to a large group of clients require many manual steps. Third, the prior methods do not attempt to keep track of an operation of a particular client. Therefore, changing configuration data in previous methods often involves manually applying configuration data changes to a large group of clients, when in reality a smaller group of clients should have been affected by the changes. This creates inconsistency in managing configuration data and further wastes valuable network resources.

Another disadvantage of the prior methods is the difficulty in keeping track of a configuration state of a particular client. Specifically, there lacks a method that identifies the clients in a network environment, their configuration states, and their operations. Additionally, the prior methods do not provide consistent data versioning for configuration data and thus cannot identify and record a particular configuration state as a "complete" configuration state in order to support rollback or roll-forward of client configuration state. For example, when a change in configuration data adversely affects the behavior of a client, it is difficult and expensive to change the configuration state of the client to a previous "complete" configuration state. Adding to the difficulty to rollback or roll-forward a configuration state is a lack of support for auditing a sequence of changes to configuration data. This further results in inabilities to track changes that cause system instability, to monitor client performance, and to prevent conflicting configuration data changes.

Yet another disadvantage of the prior methods is the ineffectiveness in controlling access to configuration data of a particular client. The prior methods do not have an effective authorization system for controlling access to configuration data. Usually, an individual either is allowed to access and change configuration data or is denied access to the configuration data. As such, the prior methods cannot provide flexibility in allowing an individual to change/override, add/remove, and view configuration data of a client or group of clients.

The prior methods also lack knowledge of the rotation status of the servers/services in the system. Without knowing such rotation status, more than expected servers may be taken out of rotation for deployment and/or maintenance, which causes reduction of expected service availability. Further, the prior methods lack a common architecture to define how configuration data would be managed for a number of clients. There is not an integrated environment or object model that network administrators could use to write scripts to automate operational tasks. In particular, there is no scriptable application programming interface (API) or graphical user interface (GUI) that enables the majority of configuration data management to be conducted through a single interface. Also, the previous methods do not provide storage of hierarchical data that supports object sub-classing and object property inheritance and do not have a storage standard and metadata to describe stored data. Furthermore, the prior methods lack a cache system that is directly available to individual clients. This means that in the previous methods, some clients may be forced to build different sub-caches to store configuration data in different formats compatible with the sub-caches. This further causes waste of network resources, inconsistent storage formats, and inefficiency in managing configuration data.

Accordingly, a solution that seamlessly manages configuration data across different clients is desired to address one or more of these and other disadvantages.

SUMMARY OF THE INVENTION

Embodiments of the invention overcome one or more deficiencies in the known art by providing, among other things, topology data that models a network environment through a set of data structures. In an embodiment, the invention effectively permits managing client configuration data by utilizing the topology data. In this embodiment, the invention advantageously allows defining a relationship among different clients and configuration data in the topology data. Embodiments of the invention further advantageously permit centrally managing configuration data across a large group of clients via an interface component. According to one or more embodiments of the invention, a scriptable API enables handling of instructions and requests to manage clients and configuration data from the interface component. In accordance with one or more other embodiments of the invention, the scriptable API serves as an interface between the interface component and a memory area that stores the topology data. At least one embodiment of the invention also advantageously provides a GUI on the interface component for a user to manipulate clients and configuration data. Moreover, the features of embodiments of the present invention described herein are economically feasible, commercially practical, and easier to implement than currently available techniques.

Briefly described, a method employing aspects of the invention provides an interface to a function that manages a plurality of entities. The method includes receiving a request to implement a change in configuration data. The configuration data is stored in a memory area and relates to an operation of one or more entities. The method also includes identifying a plurality of the entities affected by the change in response to the received request. The method further includes implementing the change for the identified plurality of entities in accordance with the function.

In another embodiment of the invention, an application programming interface employing aspects of the invention manages a plurality of entities. The application programming interface has computer-executable instructions to receive a request to implement a change in configuration data. The configuration data is stored in a memory area and relates to an operation of one or more entities. The application programming interface also has computer-executable instructions to identify a plurality of the entities affected by the change in response to the received request. The application programming interface further has computer-executable instructions to implement the change for the identified plurality of entities in accordance with the function.

In yet another embodiment of the invention, computer-readable media employing aspects of the invention have stored thereon a data structure for modeling metadata. The data structure includes a namespace field storing data representing an entity namespace. The entity namespace defines an entity. The data structure also includes an entity field storing data identifying the defined entity. The data structure includes a relationship field storing data representing an entity relationship. The entity relationship indicates a relationship between the defined entity and another entity. The data structure further includes a relationship type field storing data representing an entity relationship type. The entity relationship type describes a type of the relationship between the defined entity and the other entity. And the data structure further includes a property field storing data representing a property of an object. The object is defined by the entity identified in the entity field.

In further yet another embodiment of the invention, in a computer system having a display and a user interface input device, a method employing aspects of the invention models network topology. The method includes displaying on the display a hierarchical representation of a relationship between a first entity and a second entity. The method also includes receiving a first indication from a user via the user interface input device. The first indication indicates selection of the first entity displayed in the hierarchical representation. The method further includes displaying on the display a list of actions available for the selected first entity. The list of actions relates to management of the selected first entity. The method further includes receiving a second indication from the user via the user interface input device. The second indication indicates selection of an action among the displayed list of actions to be performed on the selected first entity to manage the selected first entity.

In further yet another embodiment of the invention, a system employing aspects of the invention manages a plurality of entities. The system includes means for receiving a request to implement a change in configuration data. The configuration data is stored in a memory area and relates to an operation of one or more entities. The system also includes means for identifying a plurality of the entities affected by the change in response to the received request. The system further includes means for implementing the change for the identified plurality of entities in accordance with the function.

One or more computer-readable media having computer-executable instructions for managing a plurality of clients embody further aspects of the invention.

Alternatively, one embodiment of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

According to one embodiment, the invention entails a hierarchy of configuration objects that defines and represents the configuration items that needs to be managed. In another embodiment of the invention, a notification server may carry over a desired change notification to interested clients. Moreover, an interface component, according to one embodiment of the invention, may graphically show the status of a change in configuration data. And a scriptable API, which is a backbone of the interface component, may push the change in the configuration data to a configuration database.

Figure 1:
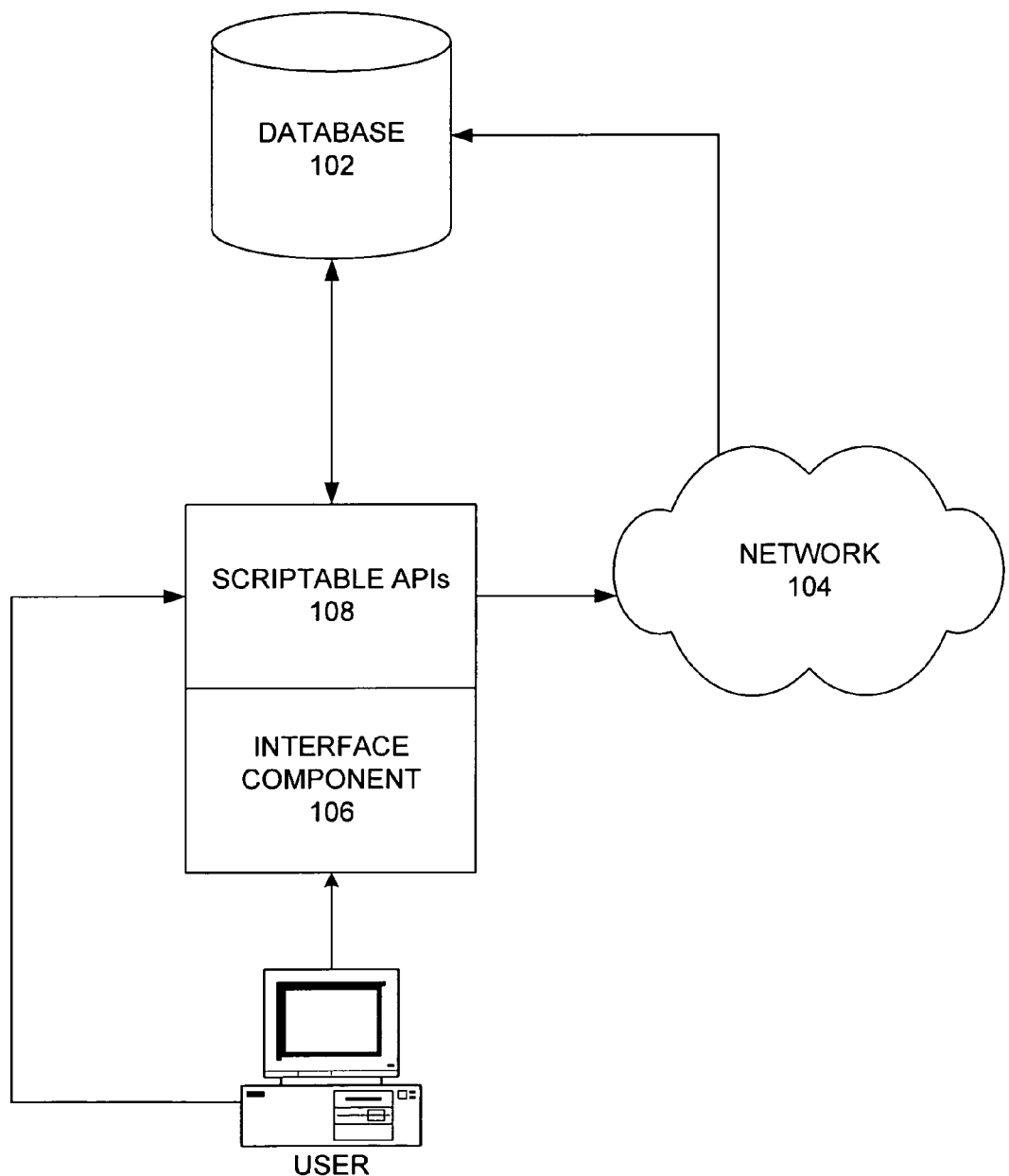
FIG. 1 is a block diagram illustrating an exemplary environment in which one embodiment of the invention may be implemented.

FIG. 1 generally illustrates an exemplary environment 100 in which embodiments of the invention may be implemented. A memory area such as a database 102 is adapted to store topology data, which through a set of data schemas and structures models the environment of a network 104. In other words, database 102 may be a data modeling tool and a repository of different entities of network 104. The network 104 comprises a plurality of clients, which in one embodiment of the invention may be servers, services, application programs, or operating system components. The environment 100 also includes an interface component 106. In one exemplary embodiment of the invention, the interface component 106 may be a GUI that allows a user to centrally manage the clients located within network 104. The user may issue one or more commands to manage the clients to interface component 106. A scriptable API 108 is adapted to receive the issued commands from interface component 106 or directly from the user and to cause a configuration data management function to execute or perform the issued commands on the clients. According to one embodiment of the invention, the scriptable API 108 is also adapted to serve as an interface between the database 102 and interface component 106. In particular, the user may use interface component 106 to issue an instruction to store data in database 102 or to query database 102 (e.g., to view configuration data of a particular client or to determine which client should be affected by a configuration data change). The scriptable API 108 may then receive the instruction and the accompanying input from interface component 106 and cause a function to execute the instruction on database 102. The result of the instruction (e.g., query result) is then returned to interface component 106 via scriptable API 108. Also shown in FIG. 1, the clients located within network 104 may also write data to database 102. For example, a particular client may store in database 102 information regarding the status of a configuration data change. The user using interface component 106 may then query database 102 for the stored information via scriptable API 108.

Data Schemas and Structures

Figure 2:
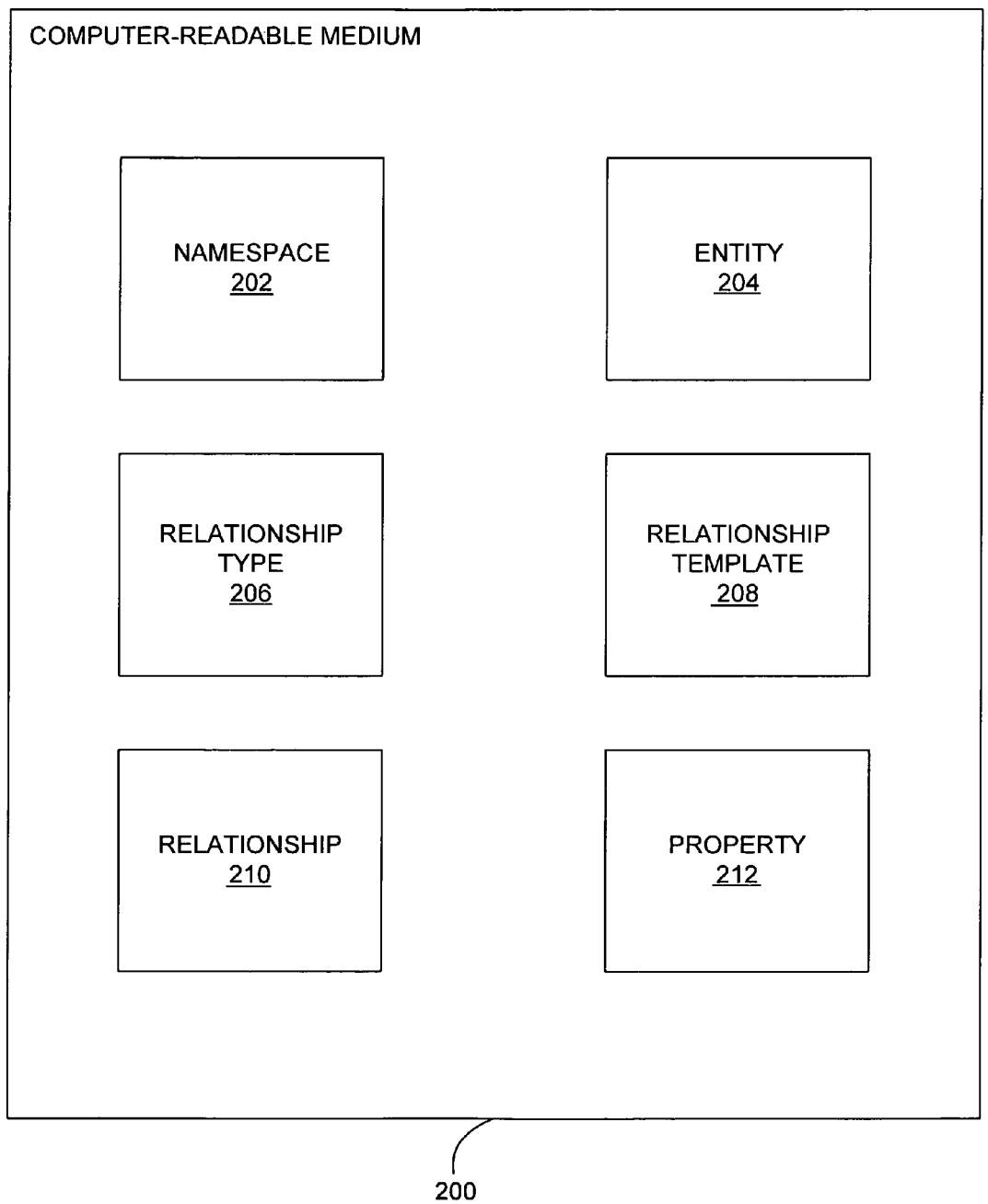
FIG. 2 is a block diagram illustrating an exemplary data structure according to one embodiment of the invention for modeling clients in a network environment.

FIG. 2 generally illustrates an exemplary data structure 200 of topology data for modeling clients in a network environment. In one embodiment of the invention, the topology data is stored in a configuration database such as database 102 and defines a relationship among a plurality of clients. As one particular example, a particular client may be a server executing a service. The server stores thereon configuration data that defines an operation of the server. The server may also belong to a server group, which may execute one or more services belonging to a service class. The service class may comprise a plurality of services that are executable on a single server. In this example, the topology data may model the relationships among the server, service, server group, service class, and configuration data.

According to one embodiment of the invention, the data structure 200 includes a plurality of fields, including a namespace field 202. The namespace field 202 is adapted to store data representing a user-defined or pre-defined entity namespace. An entity namespace is a container of unique entities, and there is an implicit many-to-one relationship between an entity and entity namespace (i.e., many entities may belong to an entity namespace). A particular entity namespace has an associated record stored in namespace field 202. The record may indicate a string name and a numeric identifier (ID) of the entity namespace.

In one exemplary embodiment of the invention, namespace field 202 stores data representing one or more of the following entity namespaces: object type (OT), object, property (Prop), object type attribute (OTA), and property attribute (Prop). The object type namespace is used to identify one or more user-defined and pre-defined object types. Specifically, an object type is a categorization of objects such as servers, services, server groups, service classes, configuration data, etc. According to one embodiment of the invention, a particular object type is defined by a set of object type attributes and properties. In addition, an object type may inherit some or all of its object type attributes and properties from another object type (i.e., sub-classing of object types). In other words, two different object types may be defined by some common object type attributes and properties.

The object namespace is a container of various objects. An object represents an instance of a specific object type (e.g., Server Group A is an instance of the Server Group object type). A particular object is defined by the same object type attributes and properties of the object type from which the object is instantiated. An object can be part of (or associated with) another object instantiated from a different object type (e.g., Server A is part of Server Group A). And an object may be a child of another object, thus inheriting the properties of the parent object.

The property namespace is a container of properties that define one or more object types. A particular property is further defined by one or more property attributes. Table 1 provides exemplary property attributes that may define a particular property.

TABLE 1

Exemplary Property Attributes

| Property Attribute | Data Type | Description |
|---|---|---|
| PropA_MultiInstance | VT_BOOL | If set to TRUE, this property is a multi-instance or multi-value property. |

TABLE 1-continued

Exemplary Property Attributes

| Property Attribute | Data Type | Description |
|---|---|---|
| PropA_Encrypted | VT_BOOL | If set to TRUE, this property stores an encrypted value. |
| PropA_DisplayAsDecrypted | VT_BOOL | Applicable if PropA_Encrypted is set to TRUE. If PropA_DisplayAsDecrypted is set to TRUE, the encrypted value of the property will be decrypted before display of the property value. |
| PropA_EncryptProgID | VT_BSTR | Used to obtain the encryption and decryption interface to encrypt and decrypt the property value. |
| PropA_DataType | VT_I4 | Used to specify data type of the property. |
| PropA_UseBlob | VT_BOOL | If set to TRUE, the property is stored as a sql_variant or image. |
| PropA_ReadOnly | VT_BOOL | If set to TRUE, this property is a read-only property. |
| PropA_Hidden | VT_BOOL | If set to TRUE, this property is a hidden property. |
| PropA_Default | VT_BSTR | Used to specify the default value of the property. |
| PropA_Description | VT_BSTR | A description of the property. |
| PropA_ClusterSpecific | VT_BOOL | If set to TRUE, the property contains different values in different service clusters. For example, the configuration system may be deployed in a test cluster (TC) and a beta cluster (BC) such that some of the properties may contain different values in TC than in BC. |
| PropA_Owner | VT_BSTR | Development owner of the property. Used for problem escalation. |

The object type attribute namespace is used to identify one or more object type attributes. As discussed, the object type attributes may define one or more different object types. Table 2 below provides exemplary object type attributes according to one embodiment of the invention.

TABLE 2

Exemplary Object Type Attributes

| Object Type Attribute | Data Type | Description |
|---|---|---|
| OTA_Hierarchical | VT_BOOL | If set to TRUE, there is an object hierarchy (e.g., parent-child relationship) associated with this object type. |
| OTA_RequireServiceRestart | VT_BOOL | If set to TRUE, a client (e.g., a service) affected by an object change needs to be restarted. |
| OTA_RequireReset | VT_BOOL | If set to TRUE, a client (e.g., a service) affected by an object change needs to perform a reset. |
| OTA_RequireReboot | VT_BOOL | If set to TRUE, a client (e.g., a service) affected by an object change needs to be rebooted. |
| OTA_LRU | VT_I2 | Used to indicate the maximum cache size (number of objects). Set to 0 for unlimited cache. |
| OTA_TTL | VT_I4 | Used to indicate the maximum time for an object to exist in a cache before it is invalidated. Set to 0 for no limit. |
| OTA_Autorefresh | VT_BOOL | If set to TRUE, after the maximum time indicated in OTA_TTL is expired, the cache is refreshed or invalidated. |
| OTA_CacheType | VT_I1 | Used to indicate the type of cache. For example, Load-On-Demand, Pre-Loaded, or Not-Cached. |
| OTA_ProgID | VT_BSTR | Used to instantiate the cached object. Used for specific objects that need further processing after they are loaded from a database (e.g., object decrypting, uniform resource locator (URL) decoding, etc.). |
| OTA_ReadOnly | VT_BOOL | If set to TRUE, this is a read-only object. |
| OTA_Hidden | VT_BOOL | If set to TRUE, this is a hidden object |
| OTA_NotificationTarget | VT_BSTR | Used to indicate notification targets of an object change. If set to NULL, then the object does not need a change notification. |
| OTA_SingleObjectInstance | VT_BOOL | If set to TRUE, the object type has one instance. |
| OTA_SingleObject | VT_BOOL | If set to TRUE, this object type has one object. |
| OTA_Category | VT_BSTR | An ID of the category that this object type belongs to. |

TABLE 2-continued

Exemplary Object Type Attributes

| Object Type Attribute | Data Type | Description |
| --- | --- | --- |
| OTA_NoCreate | VT_BOOL | If set to TRUE, objects of this object type cannot be created. |
| OTA_NoDelete | VT_BOOL | If set to TRUE, objects of this object type cannot be deleted. |
| OTA_Description | VT_BSTR | A description of the object type. |
| OTA_Index1, OTA_Index2, OTA_Index3 | VT_BSTR | If set to TRUE, it contains the property name to be indexed in the object type. This allows efficient filtering or querying of objects based on property values. |
| OTA_ClusterSpecific | VT_BOOL | If set to TRUE, the object type contains different values in different service clusters. For example, the configuration system may be deployed in a test cluster (TC) and a beta cluster (BC) such that some of the object types may contain different values in TC than in BC. |
| OTA_Owner | VT_BSTR | Development owner of the property. Used for problem escalation. |

According to one embodiment of the invention, the data structure 200 also includes an entity field 204. The entity field 204 is adapted to store data representing various entities (e.g., a particular object type, object, object type attribute, property, or property attribute). An entity can have multiple instances and be release sensitive (e.g., the Server object type can have multiple server objects having a release version number). And an entity change (e.g., a configuration data change of a server) may be transacted and represented by a transaction identifier (TrxID). The TrxID may point to a transaction object that describes the transaction in detail and thus allows the transaction to be rolled back or rolled forward. A particular entity has an associated record in entity field 204. The record may indicate a numeric ID, TrxID, string name, namespace, and version number of the entity. Furthermore, the record may also store a TrxDeleteDateTime indicating the date and time that a transaction related to the entity is deleted.

Data structure 200 also includes a relationship type field 206 adapted to store data representing a type of relationship between different entities (e.g., Server A is a part of Server Group B, Server A is a child of Server B, etc.). For a particular entity relationship type, a record is created in the relationship type field 206 to indicate a numeric ID and string name of the entity relationship type. Table 3 lists exemplary entity relationship types according to one embodiment of the invention.

TABLE 3

Exemplary Entity Relationship Types

| Entity Relationship Type | Source Entity | Target Entity |
| --- | --- | --- |
| Is an attribute of object type | Object Type Attribute | Object Type |
| Is a property of object type | Property | Object Type |
| Has attributes of object type | Object Type | Object Type |
| Has properties of object type | Object Type | Object Type |
| Is an attribute of property | Property Attribute | Property |
| Has attributes of property | Property | Property |
| Is an instance of object type | Object | Object Type |
| Is a child of object | Object | Object |
| Is a part of object (Is associated with object) | Object | Object |

Data structure 200 further includes a relationship template field 208 for storing valid formations of namespace relationships. The field 208 may include a record that indicates a source entity namespace ID, a target entity namespace ID, a relationship type between the source entity namespace and the target entity namespace, and a formation of the relationship (e.g., one-to-many, many-to-one, one-to-one, or many-to-many). For example, the records stored in relationship template field 208 may indicate that the relationship "Object Type Attribute is an attribute of Object Type" is a many-to-many relationship in that multiple object type attributes may belong to multiple object types. In another example, the relationship "Server is part of Server Group" is a many-to-one relationship in that multiple servers can belong to one server group.

In one embodiment of the invention, a user may define a relationship between different entities. For example, the user may specify that Server A is a part of Server Group A or that the object type attribute OTA_ReadOnly=FALSE is an attribute of the Service object type. As such, data structure 200 includes a relationship field 210 to store data identifying relationships among various entities. A particular entity relationship has a corresponding record stored in the relationship field 210. This record indicates a numeric ID of the source entity and a numeric ID of the target entity. The numeric ID of the entity relationship type between the source entity and the target entity is further stored in the record. In addition, a TrxID of the transaction that defines the relationship and a TrxDeleteDateTime of the transaction are also stored in the record for rollback or roll-forward purposes. If the source entity has a defined value, then the defined value of the source entity may also be stored in the record to help defining the relationship. For example, in the relationship "OTA_ReadOnly=FALSE is an attribute of the Service object type," the defined value of OTA_ReadOnly (i.e., FALSE) may be stored in the record as a relationship value. Likewise, in the relationship "PropA_ReadOnly=TRUE is an attribute of Property A," the defined value of PropA_ReadOnly may be stored as a relationship value.

According to another embodiment of the invention, a property field 212 of data structure 200 is adapted to store property values of a particular object. The property field 212 includes a plurality of records. Specifically, a record of property field 212 stores information regarding a particular object (e.g., a numeric ID of the object) and its associated property (e.g., a numeric ID of the property and the property values). And the record may store a TrxID pointing to a transaction that changed property values of the object as well as a TrxDeleteDateTime of the transaction.

The data schema shown in FIG. 2 allows embodiments of the invention to provide effective rollback and roll-forward of a client configuration state. As one particular example, there may be a Configuration object type that has a range of TrxIDs and that allows a user to implement a configuration data change on a client. In this example, the user may via interface component 106 enter a request to implement the configuration data change on the client. As a result of the entered request, a transaction object is created and stored in database 102. In addition, the value of a CurrentTrxID variable of the Configuration object type is set to the value of a NextTrxID variable of the Configuration object type, and the value of NextTrxID is incremented by a predefined number. Moreover, a transaction stack (TrxStack) of the Configuration object type is reset. The new value of CurrentTrxID is then recorded as the TrxIDs of the associated records in entity field 204, relationship field 210, and property field 212. To support configuration state rollback and roll-forward, the user may via interface component 106 mark the resulting configuration state as a "complete" (or "last known good") configuration state. As such, the new value of CurrentTrxID is recorded as the value of a LastKnownGoodStateID variable of the Configuration object type.

After one or more subsequent configuration data changes executed on the client, the user may decide to rollback the current configuration state to the marked "complete" configuration state (or to another prior transaction). The user thus via interface component 106 enters a request to rollback the configuration state. As a result of the request, the TrxDeleteDateTime of the records in entity field 204, relationship field 210, and property field 212 having a TrxID greater than the value of LastKnownGoodStateID are set to the current date and time. Furthermore, the value of CurrentTrxID is appended to TrxStack of the Configuration object type, and the value of CurrentTrxID is set to the value of LastKnownGoodStateID.

If the user decides to undo or cancel a previous rollback (i.e., roll-forward of the configuration state), he or she may via interface component 106 enter a request to do so. In response to the entered request, the TrxDeleteDateTime of the records in entity field 204, relationship field 210, and property field 212 having a TrxID greater than the value of CurrentTrxID but less than the value of the last entry in TrxStack are set to null. In addition, the value of CurrentTrxID is set to the value of the last entry in TrxStack, and then the last entry in TrxStack is removed.

Figure 3:
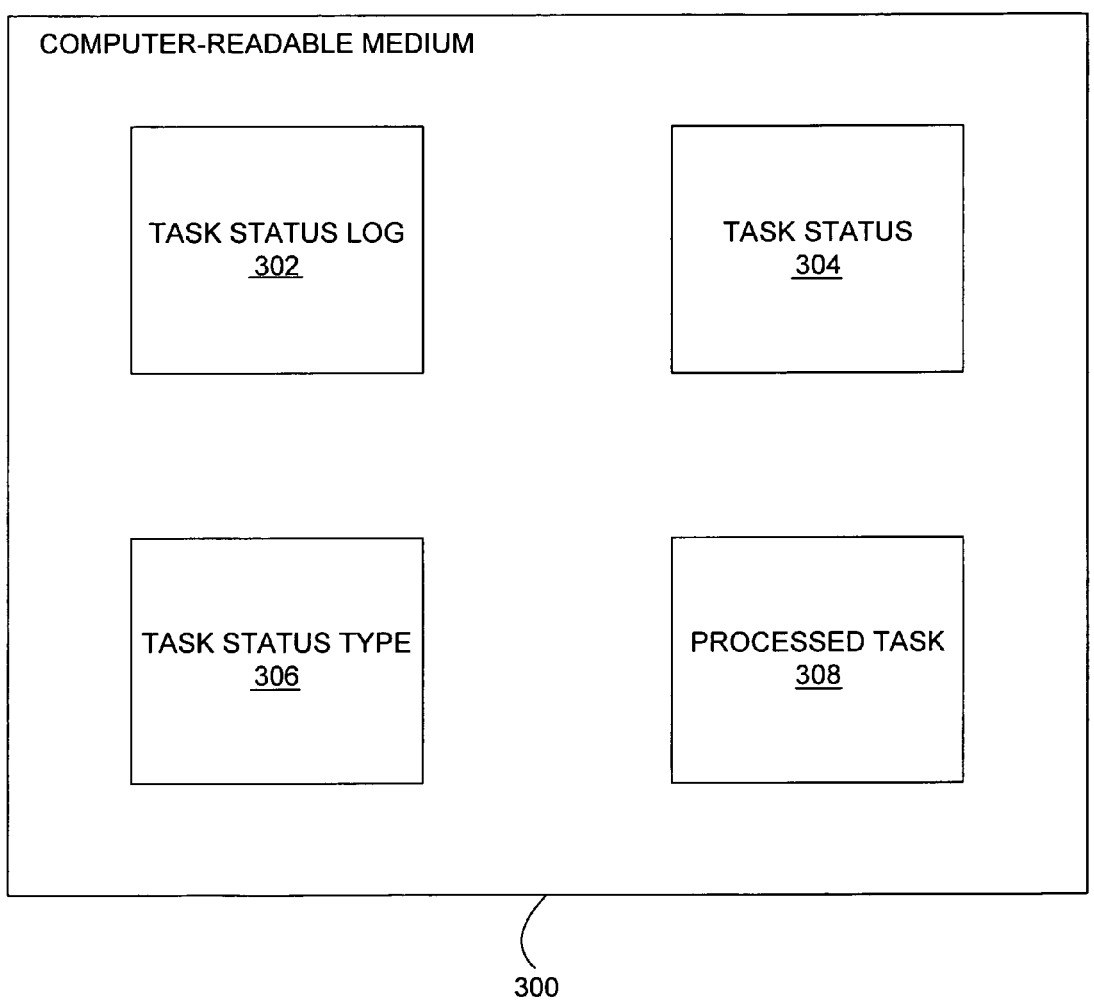
FIG. 3 is a block diagram illustrating an exemplary data structure according to one embodiment of the invention for tracking a task to manage a client.

FIG. 3 generally illustrates an exemplary data structure 300 for tracking a task to manage a client. In one embodiment, the data structure 300 may be stored in a notification status database (e.g., database 102) accessible by different clients within network 102 and a user using interface component 106. The data structure 300 includes a task status log field 302, which is adapted to store execution status of a particular task to manage a client. For example, a client being executed with a task may log the current status of the task execution to the task status log field 302. In one exemplary embodiment of the invention, task status log field 302 includes a plurality of records corresponding to different tasks. A record stores a numeric ID identifying a particular task. Associated with the task numeric ID is a type of the task as well as a trigger object ID, which identifies a notification trigger that initiated the task. A command object ID identifies the issued command of task execution. The record also stores a transaction ID, which identifies the changes made by the task. In addition, a target server ID, a target service ID, and a data center ID identify the server, service, and data center where the task is to be performed. As discussed, the record further stores the current task status logged by the client.

Data structure 300 also includes a task status field 304 derived from task status log field 302 for storing data indicating the current status of a task recorded in task status log field 302. A list of possible status of a task is provided in Table 4.

TABLE 4

Possible Task Status

| Status | Description |
| --- | --- |
| Triggered | The notification is triggered. |
| Sent | The notification is sent. |
| Skipped | The scheduled task is skipped. |
| Received | The notification is received by a client. |
| Started Processing | The task is being processed. |
| Processed with Success | The task is successfully processed. |
| Processed with Failure | The task is processed, but a failure occurred. |
| Process Completed | The task is completed. |
| Aborted | The task is aborted. |
| Task Expired | The execution time of the scheduled task is expired. |

Data structure further includes a task status type field 306. The task status type field 306 may store data identifying a task type of an existing task. According to one embodiment of the invention, a particular task may be of a notification type, a scheduling type, a monitoring type, or a configuration object type. A notification task notifies a client within a network environment of a command or task issued by a user. A scheduling task schedules the execution time (either one-time or recurring) of another task. A monitoring task is utilized to monitor another client. A configuration object type may generate extended markup language (XML) object to perform configuration data changes.

In one embodiment of the invention, a processed task field 308 of data structure 300 is adapted to identify a task that is being processed and is used to prevent the same task from being processed multiple times. For a particular task being processed, the processed task field 308 stores a record associated with the task. The record indicates a numeric ID of the task (e.g., trigger object ID or scheduled task object ID), a type of the task, and instances of the task (e.g., there may be multiple instances if the task is recurring). The record may also indicate the processor used to process the task, the last date and time that the task is being processed, and the current status of the task.

Figure 4:
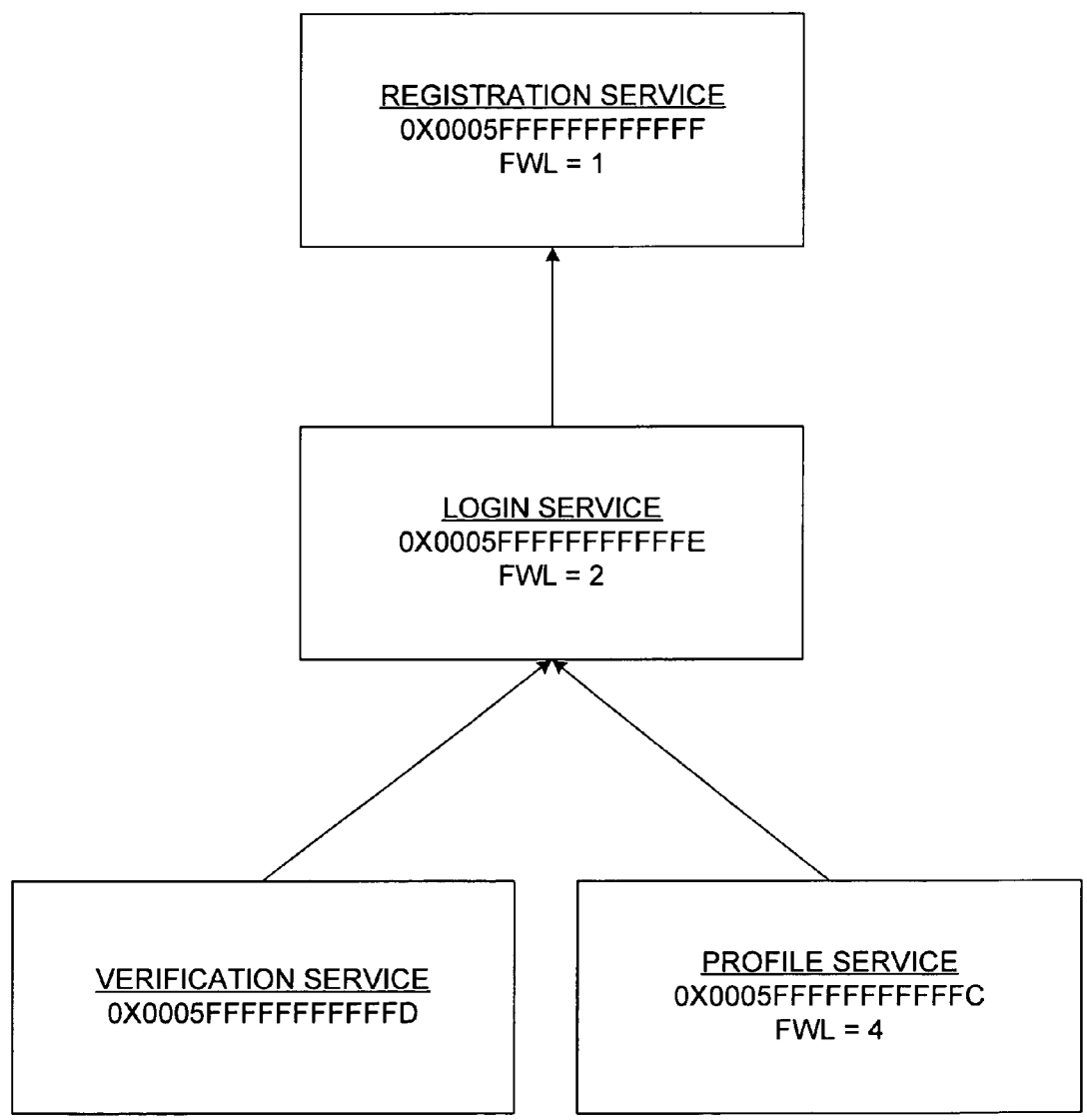
FIG. 4 is a diagram illustrating one example of client subclassing and inheritance according to one embodiment of the invention.

FIG. 4 illustrates one particular example of client subclassing and inheritance according to one embodiment of the invention. As discussed, the topology data stored in database 102 may identify relationships among multiple clients. For example, data structure 200 of the topology data allows a user to define relationships between different entities. FIG. 4 shows the importance of such defined relationships. Illustrated in FIG. 4 is a Service object type with four Service objects, namely Registration Service, Login Service, Verification Service, and Profile Service. As can be seen, Login Service is a child of Registration Service, and both Verification Service and Profile Service are children of Login Service. In an exemplary embodiment of the invention, such relationships are recorded in relationship field 210 of data structure 200. Also can be seen in FIG. 4, Registration Service, Login Service and Profile Service have associated forbidden word lists (FWLs), while Verification Service does not have a FWL and thus inherits the FWL of its parent (i.e., Login Service).

According to one exemplary embodiment of the invention, to query for the FWL of a particular Service object, one may perform the following algorithm:

```
Set current SourceEntity to the source object
While SourceEntity is not null
Begin
    Get property value from SourceEntity
    If property value is not found
        Set SourceEntity = Parent of SourceEntity
    Else
        Break
End
```

Accordingly, in the example illustrated in FIG. 4, if one wishes to get the FWL of Verification Service, the SourceEntity would initially be set to Verification Service. Since a FWL is not found in Verification Service, the SourceEntity is set to the parent of Verification Service, namely Login Service. Because Login Service has an associated FWL, the FWL of Login Service is thus obtained as the FWL of Verification Service. As can be seen in this example, entity sub-classing and inheritance allows one to manage multiple clients effectively. Specifically, if a user wishes to manage or change configuration data of a particular client, he or she may identify other affected clients based on such entity relationships indicated by the topology data. As such, a configuration data change may be applied uniformly and consistently across a large group of clients.

Figure 5:
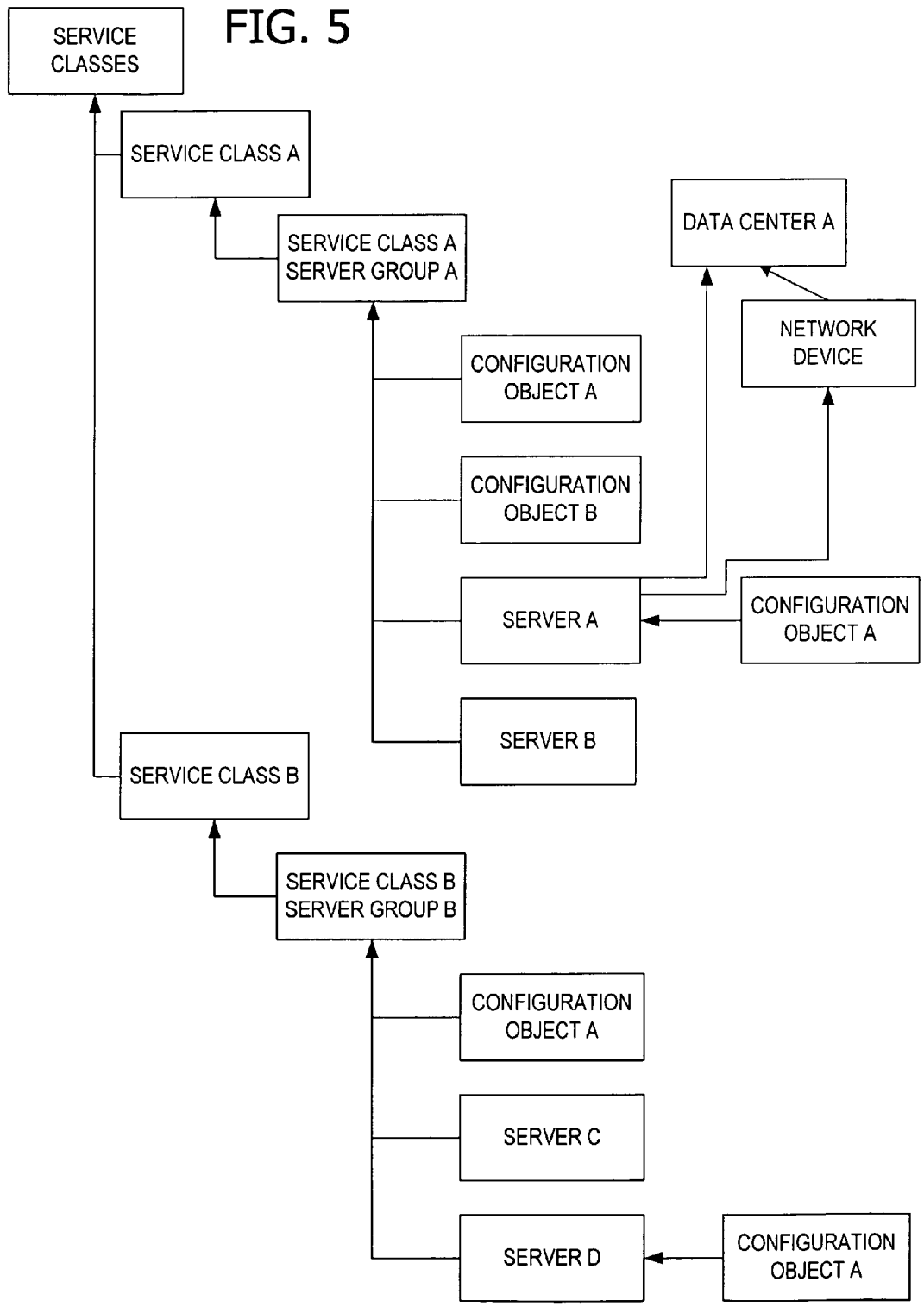
FIG. 5 is a diagram illustrating an exemplary hierarchical relationship between various clients according to one embodiment of the invention.

FIG. 5 illustrates an exemplary hierarchical relationship between various clients according to one embodiment of the invention. In particular, FIG. 5 illustrates relationships between different service classes, server groups, servers, and configuration objects. According to one embodiment of the invention, a configuration object is a collection of configuration items, which represent data that describe aspects of a configuration setting (e.g., how software installed on a server operates). For example, configuration items that relate to a specific aspect of a service may together form a configuration object. A configuration object further represents the basic unit of configuration data manipulation. As such, a change to a configuration item of a specific configuration object results in a change to the whole configuration object. Other configuration items of this configuration object that are not changed may be recreated with the same values.

In accordance with another embodiment of the invention, configuration objects that are not directly associated with a client (e.g., server) or a group of clients (e.g., server group) are considered to be default configuration objects of various types (with instance=0 and may not be deleted absent some special circumstances). That is, the default configuration objects are in the highest level of network hierarchy. Accordingly, clients within the network are associated with the default configuration objects. On the other hand, configuration objects that are directly associated with a client or group of clients are considered overrides of the default configuration objects (with the name as the corresponding default configuration object type but with instance≠0). These overrides are adapted to ignore changes to configuration items of a configuration object located at higher levels of the hierarchy (e.g., default configuration object) and having the same type as the overrides. In a particular example, if a client or group of clients does not have an associated configuration object of a particular type, then this client or group of clients inherits the values from a higher level of the hierarchy, until the highest level is reached. In that case, the client or group of clients inherits the values of a default configuration object having the same type. In contrast, if the client or group of clients has an associated configuration object, then the values of the associated configuration object override values from higher levels of the hierarchy, including that of the default configuration object having the same type.

As can be seen, FIG. 5 illustrates two service classes, namely Service Class A and Service Class B. Both Service Class A and Service Class B have one server group. In addition, a particular server group carries two servers. FIG. 5 also shows two types of configuration objects, namely Configuration Object A and Configuration Object B. As illustrated in FIG. 5, Server Group A of Service Class A has an associated Configuration Object A, which overrides values of the default Configuration Object A. Server A of Server Group A also has an associated Configuration Object A. Accordingly, the Configuration Object A associated with Server A overrides both the default Configuration Object A and the Configuration Object A associated with Server Group A. Since Server B does not have a Configuration Object A associated with it, it inherits the values of the Configuration Object A associated with Server Group A. Furthermore, since both Server A and Server B do not have an associated Configuration Object B, they inherit the values of the Configuration Object B associated with Server Group A.

Similarly, Server Group B of Service Class B also has an associated Configuration Object A, which overrides values of the default Configuration Object A. Server D of Server Group B also has an associated Configuration Object A. Accordingly, the Configuration Object A associated with Server D overrides both the default Configuration Object A and the Configuration Object A associated with Server Group B. In addition, since Server C does not have a Configuration Object A associated with it, it inherits the values of the Configuration Object A associated with Server Group B.

FIG. 5 further shows other hierarchical relationships. As one particular example, FIG. 5 illustrates that Server A is a part of Server Group A and Data Center A, and that Server Group A is a part of Server Class A. Such hierarchical relationships may be easily manipulated by a user. In one instance, the user may move one particular server from a server group to another server group by severing the part-of relationship with the old server group and inserting a new part-of relationship with the new server group. In another embodiment of the invention, a configuration object may apply to two different services that belong to different service classes (e.g., Configuration Object A applies both to services in Service Class A and services in Service Class B). In such a scenario, if a change to the configuration object is needed, a user may need to globally apply the change, i.e., apply the change to the default configuration object, in order to avoid two services relying on the same configuration object to behave differently because they belong to different service classes.

FIG. 5 further illustrates a network device located in Data Center A. The network device in essence is a physical device to which a server may be connected (e.g., FIG. 5 illustrates that Server A is connected to the network device). Examples of the network device may be a load balancer or a dispatcher. In the topology data, the network device is represented as an object called NetworkDevice that a Server object may be a part of. According to one embodiment of the invention, a service called NetworkDeviceProxyService is interested in changes that affect a particular server hosting it. When a user implements a configuration data change, a notification trigger may be dispatched to servers hosting NetworkDeviceProxyService. A server hosting NetworkDeviceProxyService is a part of a network device associated with NetworkDeviceProxyService. Accordingly, a configuration data change relating to this server may be notified to other servers that are part of the same network device. Specifically, these servers have the attribute OTA_NotificationTarget=NetworkDeviceProxyService such that changes relating to them will be notified to other servers also hosting NetworkDeviceProxyService. And if a notification relates to the network device associated with NetworkDeviceProxyService, NetworkDeviceProxyService may deliver the notification to the servers that are part of the impacted network device.

Interface Component

Interface component 106 provides a common user-flow and set of features for configuration data management. As discussed, interface component 106 may be a GUI that provides a unified view of clients and configuration data and may support various auditing and user authorization requirements. According to one embodiment of the invention, interface component 106 allows a user to centrally perform various functions, including client management, configuration data management, client deployment, transaction management, and notification management.

Figure 6:
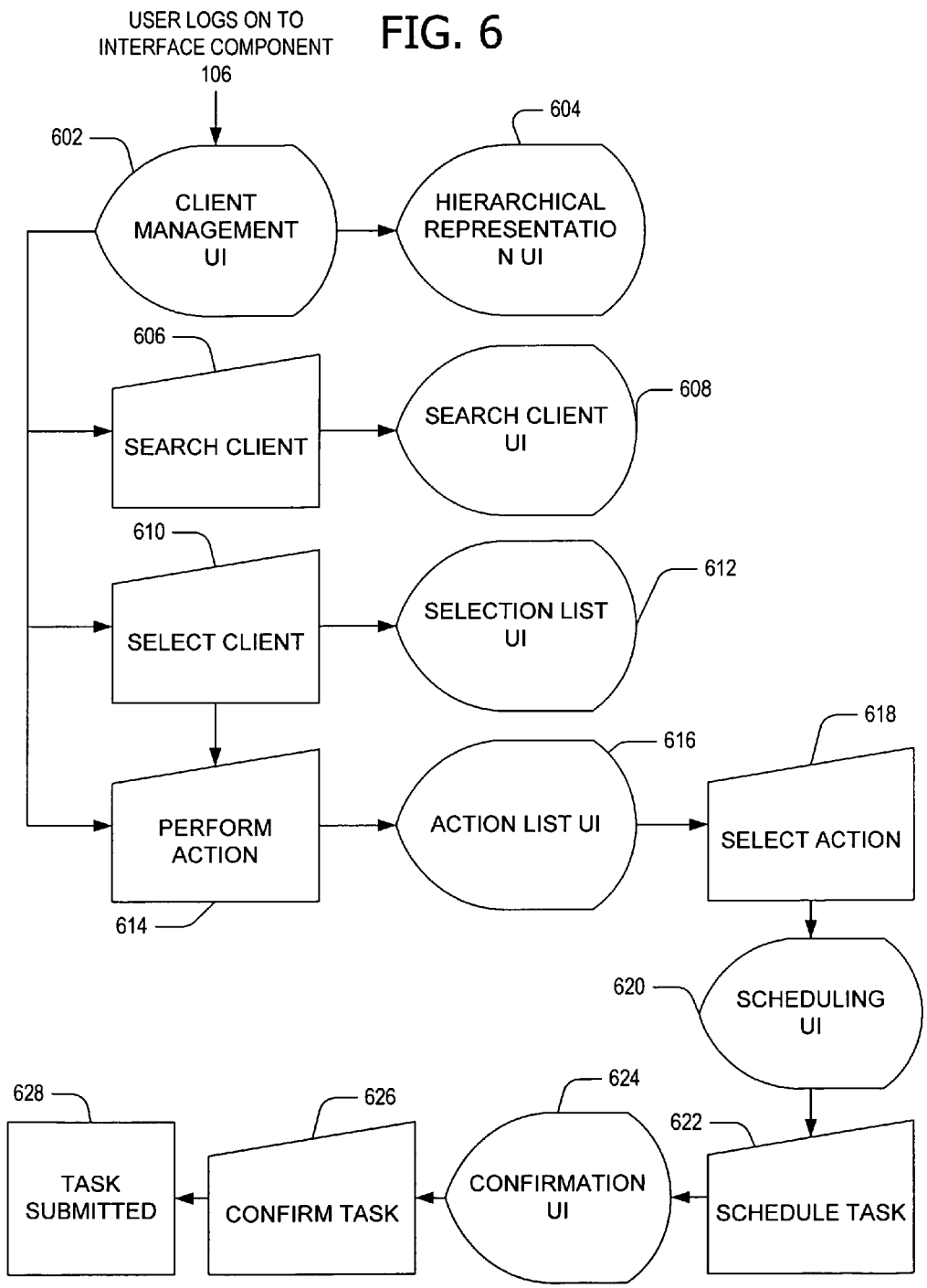
FIG. 6 is a flow diagram illustrating operational flow according to one embodiment of the invention for a user to perform a client management function.

FIG. 6 generally illustrates an exemplary operational flow according to one embodiment of the invention for a user to perform a client management function using interface component 106. FIG. 6 involves a user who has logged on to interface component 106. Upon logging on to interface component 106, scriptable API 108 may receive a user credential (e.g., user ID) of the user from interface component 106 and submit the user credential to an authentication/authorization service. Based on the user credential, the authentication/authorization service may assign an authorization role to the user. The authorization role defines a set of functions that the user may perform via interface component 106. For example, the authorization role may allow the user to view and/or update certain clients via interface component 106 but deny the user access to other clients. After the authorization role of the user is returned to interface component 106 via scriptable API 108, the user may launch a client management user interface (UI) from interface component 106 at 602. In an alternative embodiment of the invention, the authorization role is not assigned to the user upon logging on to interface component 106, but instead is assigned when the user has submitted a request to manage a particular client, group of clients, or configuration data to interface component 106. In this alternative embodiment of the invention, the authorization role may identify whether the user has the authorization to manage this specific client, group of clients, or configuration data.

Figure 7:
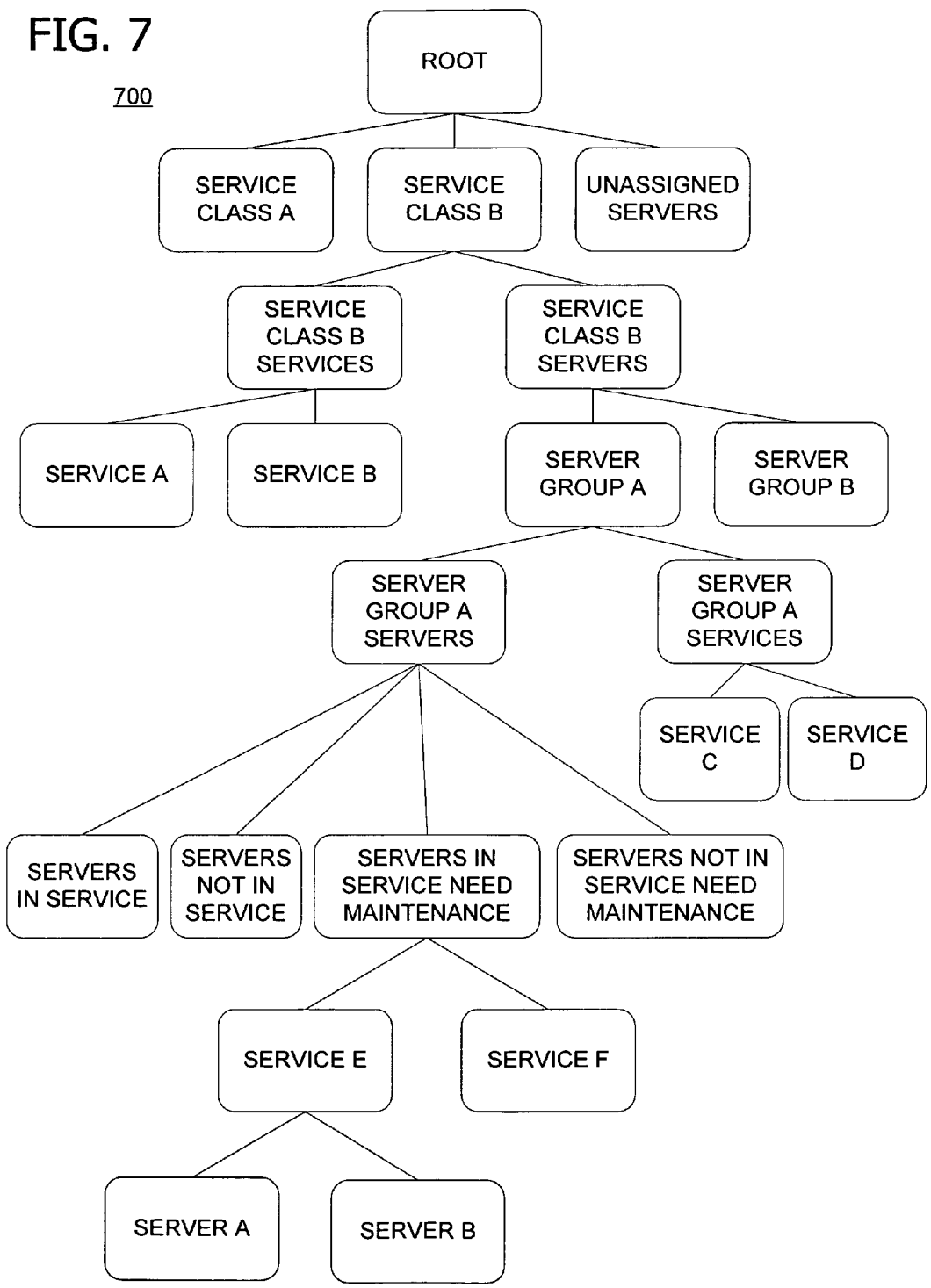
FIG. 7 is a block diagram illustrating an exemplary hierarchical representation of a network environment according to one embodiment of the invention.

The client management UI allows the user to centrally manage clients within network 104 (e.g., to rotate, reboot, reset, start, restart, or stop clients). After the client management UI is opened, another UI displaying a hierarchical representation (e.g., a tree view) of the clients within network 104 is provided to the user at 604. The hierarchical representation UI, which is generally illustrated in FIG. 7, is based on the topology data stored in database 102 and identifies the clients located within network 104 as well the relationships among different clients. In particular, scriptable API 108 may request the topology data from database 102 when the client management UI is opened (or when a request to manage a client or group of clients is subsequently received from the user) and return the topology data to interface component 106. By graphically depicting the relationships among different clients, the hierarchical representation UI allows the user to identify which clients should be targeted for management.

As can be seen, the client management UI includes an option for the user to search for a particular client. Upon selection of the option at 606 (e.g., by sending a signal or indication via a user interface input device), a search client UI is provided to the user at 608. The search client UI includes a number of open form fields for the user to enter search parameters. For example, the search parameters may include client name, prefix sub-string of client name, or other sub-strings of client name. Upon entry and submission of the search parameters by the user, interface component 106 is adapted to query database 102 via scriptable API 108 for a client that has properties matching the search parameters. The search result is then returned to interface component 106 for display in the hierarchical representation UI. In one embodiment, the matching client is highlighted in the hierarchical representation UI to identify the matching client clearly.

According to one embodiment of the invention, if the user decides to select a particular client to perform a client management task, he or she may highlight the client in the hierarchical representation UI and choose an option (e.g., a right arrow button) to select the highlighted client at 610. Upon selection of the highlighted client, the highlighted client will be displayed in a selection list UI at 612. The user may also choose what type of clients may be selected into the selection list UI. For example, the user may choose an option that would allow selection of servers located within network 104. If this option is chosen, the client management UI may prohibit client types other than servers from being selected into the selection list UI. And client types other than servers will be shown in the hierarchical representation UI in a different visual style (e.g., gray text) to indicate that they are not selectable. In one embodiment of the invention, after a client is selected into the selection list UI, the option to choose the type of selectable clients is disabled, but an option to remove a client from the selection list UI (e.g., a left arrow button) may be enabled. If the user empties the selection list UI, then the option to choose the type of selectable clients is enabled again, and the option to remove a client from the selection list UI may be disabled.

The client management UI also includes an option for the user to perform actions on the clients selected into the selection list UI. Upon selection of this option at 614, an action list UI is provided to the user at 616. The action list UI provides a list of actions available for the clients selected into the selection list UI. As one particular example, the list of actions may include an Add Client action for adding a client to network 104. Upon selecting the Add Client action, a UI will be provided for the user to enter the new client information as well as the location within network 104 where the new client should be placed (e.g., what relationship should be defined). A Move Client action may also be included in the list of actions for moving clients within network 104. For example, the user may move a server within network 104 to another server group within the same service class. After the server is moved, the server may be marked as "needing full refresh" (i.e., in a "pending refresh" operational state) so as to inform the user that a configuration data change to refresh the server may be needed. On the other hand, if the server is moved to another server group in a different service class, then the server may be marked as "needing reinstall" (i.e., in a "pending deployment" operational state) to inform the user that the moved server may need to be reinstalled to become operational.

According to one embodiment of the invention, the list of actions may also include a Delete Client action for removing a client from network 104, a Generate Configuration XML action for requesting to implement a configuration data change, and an Uninstall action for uninstalling software settings of a client. In one embodiment of the invention, if the selected client is a server and if it is currently executing a service or needs to be maintained, then the described actions may be disabled to avoid disrupting the hosted service or causing unexpected results. In other words, the user may need to bring the server out of service before the actions are available to be implemented on the server. After being provided with a list of available actions in the action list UI, the user may proceed to 618 to select a particular action in the list of actions.

According to another embodiment of the invention, upon selecting a particular action, a scheduling UI may be provided to the user at 620 for scheduling a task represented by the selected action. The scheduling UI allows the user to either release the task immediately or schedule the task. If the user chooses to schedule the task, then the scheduling UI may provide a number of scheduling fields. For example, the scheduling fields may include a start or effective date and time for performing the task. The user may also specify a task name, an indication if the task is recurring, a frequency of recurrence, an end date and time if the task is recurring, and a number of times that the task is to recur. If two tasks are dependent on each other, the user may also need to enter a time interval during which the dependent tasks may not both be executed.

After the user has inputted the scheduling parameters via, for example, the user interface input device and has selected an option to schedule the task at 622, a confirmation UI may be provided to the user at 624 allowing the user to confirm the scheduled task (or confirming a task to be immediately released). The confirmation UI may show a warning if the user has specified incorrect information or if the task cannot be performed on the selected client (e.g., the server is currently hosting a service). Furthermore, the confirmation UI may need the user to enter an approver, a ticket number, and a description of the task before enabling a commit option for the user to commit the task. After the user has entered the needed information and has selected the commit option at 626, the task (along with the user-specified information) is then submitted to database 102 via scriptable API 108 at 628. Scriptable API 108 may then cause a function to execute the submitted task in accordance with the user-specified parameters (e.g., effective date/time, end date/time, recurrence data, etc.), whether it is to define a new relationship in the topology data or to effect a configuration data change on a client or group of clients. Accordingly, the submitted task may then be executed at an appropriate time. If the user has chosen to schedule the task, then the scheduled time of the task may be entered into the scheduling UI in local time and then be converted to coordinated universal time (UTC) before it is stored in database 102. This allows the task to be executed at an appropriate time no matter where it is to be executed.

FIG. 7 generally illustrates an exemplary hierarchical representation (indicated generally by reference character 700) displayed in the hierarchical representation UI of the client management function according to one embodiment of the invention. In this exemplary hierarchical representation, servers hosting services are used as particular examples of clients for illustration purposes. As shown in FIG. 7, the representation 700 includes a Root node, which is the universal parent for the clients located within network 104. Under the Root node are a number of service class nodes having corresponding service class names (e.g., Service Class A node and Service Class B node) and an Unassigned Servers node. Under the Unassigned Servers node is a list of servers that are not assigned to a particular service class (not shown). On the other hand, under a particular service class node is a list of servers that are assigned to that service class. For example, FIG. 7 illustrates that under the Service Class B node are a Service Class B Services node and a Service Class B Servers node. In this example, under the Service Class B Services node is a list of services belonging to Service Class B (e.g., Service A and Service B).

The hierarchical representation 700 further shows that the Service Class B Servers node has sub-nodes indicating the server groups that execute services belonging to Service Class B. In particular, representation 700 shows that both Server Group A and Server Group B execute services belonging to Service Class B. Under the Server Group A node are a Server Group A Services node and a Server Group A Servers node. The Server Group A Services node includes a list of services being executed by servers belonging to Server Group A. For example, representation 700 indicates that both Service C and Service D are services being executed by servers of Server Group A. The Server Group A Servers node includes a list of servers belonging to Server Group A. According to one embodiment of the invention, the list of servers can be categorized into four nodes. In particular, a Servers In Service node lists servers of Server Group A that are currently executing a service. A Servers Not In Service node lists servers of Server Group A that are not currently executing a service. A Servers In Service Need Maintenance node lists servers of Server Group A that are currently executing a service but need to be maintained. A Servers Not In Service Need Maintenance node lists servers of Server Group A that are not currently executing a service but also need maintenance. In the example illustrated in FIG. 7, the Servers In Service Need Maintenance node of Server Group A includes a Service E node and a Service F node. In other words, Service E and Service F are being executed by servers of Server Group A and need to be maintained. As further illustrated in FIG. 7, Server A and Server B both execute Service E, and may need to be implemented with a configuration data change since Service E currently needs maintenance.

Figure 8:
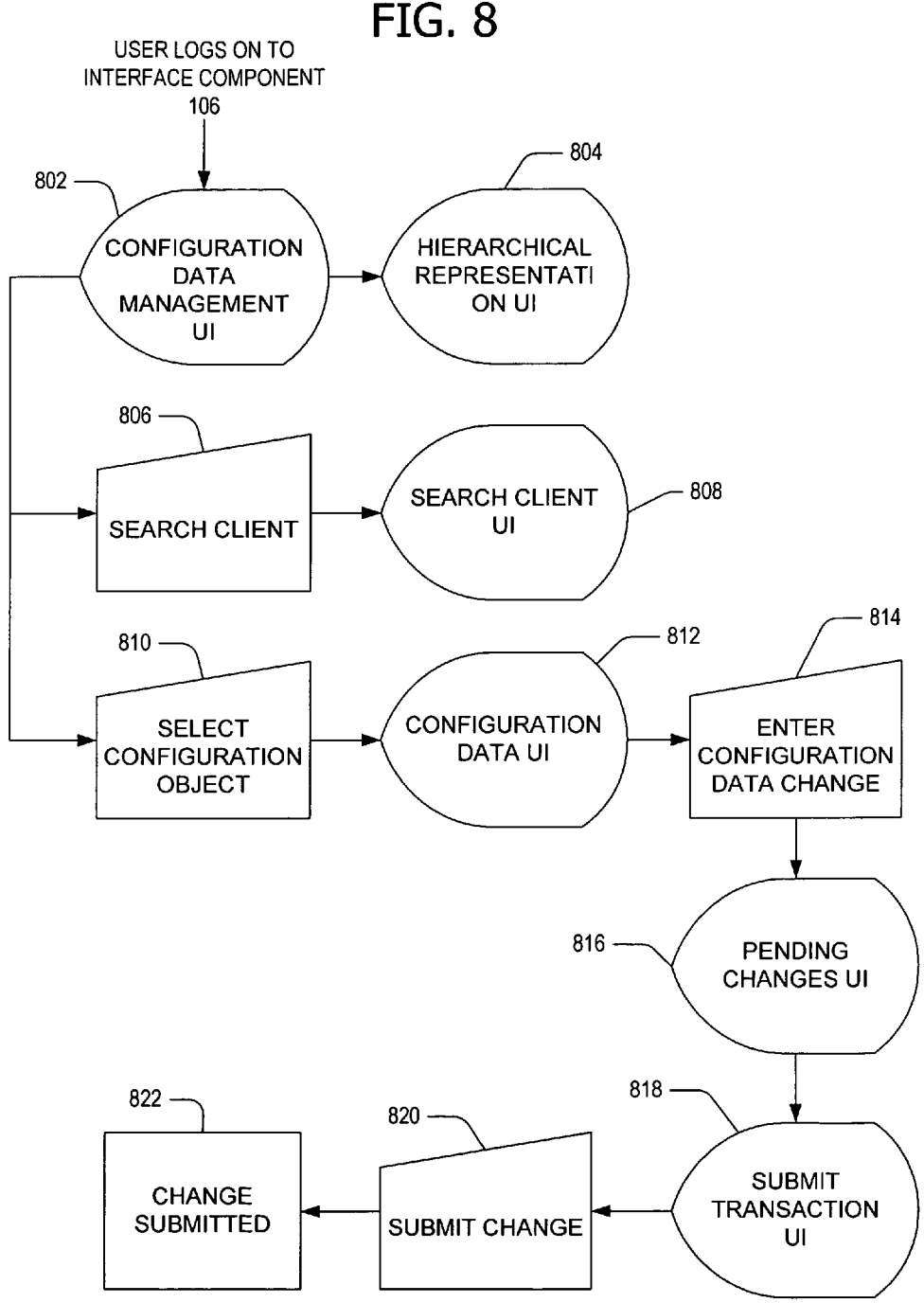
FIG. 8 is a flow diagram illustrating operational flow according to one embodiment of the invention for a user to perform a configuration data management function.

As discussed, interface component 106 also allows the user to perform functions relating to configuration data management. FIG. 8 generally illustrates an exemplary operational flow according to one embodiment of the invention for the user to perform a configuration data management function via user interface component 106. In particular, FIG. 8 illustrates a scenario where the user has logged on to interface component 106 and opened a configuration data management UI either in read/write mode or in read-only mode at 802. If the configuration data management UI is opened in read/write mode, then the user may view and edit data via the UI. In contrast, if the configuration data management UI is opened in read-only mode, then the user may view data but not edit data via the UI. If permitted by the authorization role of the user, the configuration data management UI allows the user to centrally manage various configuration data of clients located within network 104. For example, the configuration data management UI allows the user to enable or disable network traffic on a client or group of clients (e.g., a server group) or to change configuration data of the client or group of clients at once or incrementally. The user may further copy configuration data from an existing group of clients to another group. In particular, the user may copy a client group and its associated configuration data to a new client group. The new group initially does not include a client, but the user may later move clients into this new group. Alternatively, the user may select one or more clients from a client group and then chooses "use these clients to make a copy" such that the new group will include the selected clients and their associated configuration data. After the new group includes at least one client, the user then may apply a configuration data change across clients within this new group.

In another example, the user may select one or more clients from a client group and move these clients to a smoke test group. The user may then apply a configuration data change to the clients within the smoke test group. If the user determines that the smoke test is not successful, he or she may choose to discard the smoke test changes and move the clients in the smoke test group back to the original client group without applying the changes to the original group. On the other hand, if the user determines that the smoke test is successful, he or she may choose to accept the smoke test changes. Accepting the smoke test changes means that the clients in the smoke test group are moved back to the original client group, and the new settings of the smoke test group are applied to the original client group. Additionally, the user may delete a client group that he or she has created, with the result that clients in the group are changed to the "available" operational state and moved into an "available" client group.

According to yet another embodiment of the invention, the configuration data management UI allows the user to rollback and/or roll-forward a configuration state of a client. For example, the user may via the configuration data management UI mark the current configuration state of the client as a "complete" or "last known good" configuration state and provide a description for the "complete" configuration state. And when a configuration data change is submitted to the configuration data management UI, a new configuration state is created with a corresponding version number. This new configuration state is recorded in database 102 as a "delta" configuration state from the previous configuration state. In one embodiment of the invention, the user may via configuration data management UI view and compare a "complete" configuration state and the current configuration state. When the user decides to rollback the current configuration state to the "complete" configuration state, interface component 106 may determine if there are enough clients within a particular group of clients to support the traffic generated as a result of the rollback. Interface component 106 may further via the configuration data management UI display a group of clients that does not include sufficient clients and allow the user to populate this group of clients.

Figure 9:
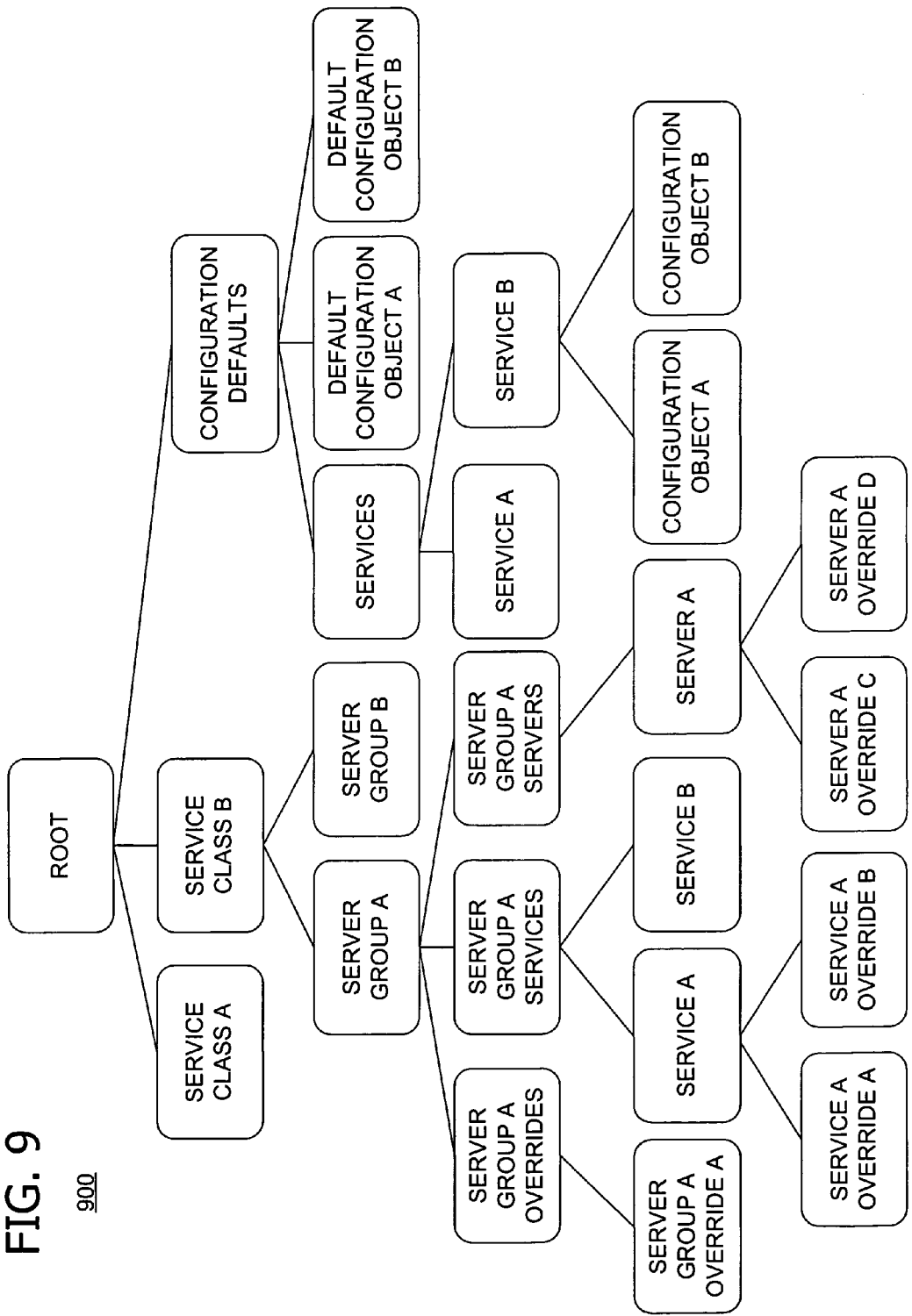
FIG. 9 is a block diagram illustrating an exemplary hierarchical representation of a network environment according to one embodiment of the invention.

As shown in FIG. 8, after the configuration data management UI is opened by the user, a hierarchical representation (e.g., a tree view) of configuration data (e.g., configuration objects) and clients within network 104 is provided to the user at 804. The hierarchical representation UI, which is generally illustrated in FIG. 9, is based on the topology data stored in database 102 and identifies the relationships among different clients and configuration data (e.g., as defined by the topology data). Particularly, scriptable API 108 may request the topology data from database 102 when the configuration data management UI is opened (or when a request to manage or change configuration data is subsequently received from the user) and return the topology data to interface component 106. By graphically depicting the relationships among different clients and configuration data, the hierarchical representation UI allows the user to identify which clients should be affected by a configuration data change.

Similar to the client management UI, the configuration data management UI includes an option for the user to search for a particular client. Upon selection of the option at 806, a search client UI is provided to the user at 808. The search client UI includes a number of open form fields for the user to enter search parameters. Upon entry and submission of the search parameters by the user, interface component 106 is adapted to query database 102 via scriptable API 108 for a client that has properties matching the search parameters. The search result is then returned to interface component 106 for display in the hierarchical representation UI.

If the user decides to select a particular configuration object to perform a configuration data management task, he or she may highlight the configuration object in the hierarchical representation UI and choose an option to select the highlighted configuration object at 810. Upon selection of the option, a configuration data UI will be provided to the user at 812. In one embodiment of the invention, the configuration data UI displays a list of configuration items (which may have multiple values) associated with the configuration object selected by the user. For a particular configuration item associated with the selected configuration object, the configuration data UI may display a description of the configuration item as well as potential consequences of changing it. Furthermore, if changing the configuration item needs a client to be rebooted, reset, restarted, etc., the configuration data UI may explicit mention this fact. In addition, a valid range of values for the configuration item, the default value needed for the configuration item, and the current value of the configuration item may be displayed in the configuration data UI.

A text area in the configuration data UI allows the user to use the user interface input device to input a pending change value (e.g., the configuration value to be changed to) for a particular configuration item of the selected configuration object. The user can also open a detailed view of a specific configuration item. For example, the detailed view may allow the user to edit large configuration item values such as XML blobs and provide the user a detailed description of the configuration item. According to one embodiment of the invention, the user may via the configuration data UI remove certain overrides (i.e., configuration objects that are associated with a particular client or group of clients) or change the values of default configuration objects. In particular, the configuration data UI may display a list of overrides associated with a client or group of clients and include an option for the user to delete one or more overrides associated with the client or group of clients. In another embodiment of the invention, if the user does not have the authority to change configuration data value or to delete an override, then the text area and/or the option to delete an override may be disabled in the configuration data UI.

After the user has entered a pending change value for a configuration item or has selected the option to delete an override at 814, the hierarchical representation UI may graphically depict the change entered by the user, and a pending changes UI will be provided to the user at 816. The pending changes UI may display a list of pending configuration data changes. In addition, the pending changes UI may also display the current value and the pending change value of a particular configuration item as well as information regarding the configuration data change (e.g., a date and time that the change is entered, an identification of the user who entered the change, and a version number of the change). Furthermore, the pending changes UI includes an option next to a displayed configuration item to allow the user to modify or undo changes relating to this configuration item. If the user modifies or undoes a change, then the hierarchical representation UI may also graphically depict such modification or undo change.

According to one embodiment of the invention, if the pending changes UI displays at least one pending configuration data change, then a submit transaction UI is provided to the user at 818. In general, the submit transaction UI displays a list of pending configuration data changes to allow the user to submit a particular pending configuration data change. For a particular pending change, the submit transaction UI may also provide detailed information about the change (e.g., a date and time that the change is entered, an identification of the user who entered the change, and a version number of the change). The transmit transaction UI may also need the user to enter information such as an approver, a ticket number, and a description of the change before enabling a "submit transaction" option for the user to submit the change. In an embodiment of the invention, the user may also specify a time interval (e.g., effective date and time) to effect or execute the change, a number of clients to be effected or executed with the change at a time, and a time period between successive executions. After the user has entered the needed information and has selected the "submit transaction" option at 820, a transaction number will be displayed to the user for future reference, and the submitted configuration data change will be cleared from the pending changes UI. At 822, scriptable API 108 will store the submitted change in database 102. Scriptable API 108 may then cause a function to execute the submitted change in accordance with the user-specified information (e.g., effective date/time of the change, a number of clients to be effected at a time, etc.), whether it is effect a configuration data change on a client or group of clients or to define in the topology data a new relationship between a configuration object and a client or group of clients.

In another embodiment of the invention, if the user decides to exit the configuration data management UI, then the configuration data management UI will determine if there is a pending change in the pending changes UI. If there is a pending change, then a warning may be displayed in the configuration data management UI informing the user that the pending change may be lost if the user exits the configuration data management UI. If the user exits the configuration data management UI without submitting the pending change, then the data regarding the pending change may be deleted.

According to yet another embodiment of the invention, two users using interface component 106 may submit conflicting changes to interface component 106. In such a scenario, the last change submitted to interface component 106 prevails over previous conflicting changes and is the one that will be effective. And when the user launches the pending changes UI or commits a configuration data change, he or she may receive a warning that another user has also launched the pending changes UI or has committed a configuration data change related to the prior user's change. The warning informs the user that his or her configuration data change may not be effective as another user's change may prevail over his or hers.

FIG. 9 generally illustrates an exemplary hierarchical representation (indicated generally by reference character 900) displayed in the hierarchical representation UI of the configuration data management function according to one embodiment of the invention. In this exemplary hierarchical representation, servers hosting services are used as particular examples of clients for illustration purposes. As shown in FIG. 9, the representation 900 includes a Root node, which is the universal parent for configuration data and the clients located within network 104. Under the Root node are a number of service class nodes having corresponding service class names (e.g., Service Class A node and Service Class B node) and a Configuration Defaults node. Under the Configuration Defaults node are a Services node including services executed by servers of network 104 and a number of default configuration object nodes. In the example illustrated in FIG. 9, there are two default configuration objects under the Configuration Defaults node, namely Default Configuration Object A and Default Configuration Object B. Further illustrated in FIG. 9, under the Services node are a Service A node and a Service B node. The hierarchical representation 900 also shows that both Configuration Object A and Configuration Object B are part of Service B (and accordingly are overrides of Default Configuration Object A and Default Configuration Object B).

Under a particular service class node is a list of server groups assigned to that service class. For example, FIG. 9 illustrates that under the Service Class B node are a Server Group A node and a Server Group B node. In this example, under the Server Group A node is a list of overrides, services, and servers associated with Server Group A. A Server Group A Overrides node under the Server Group A node lists the overrides associated with Server Group A (e.g., Server Group A Override A). A Server Group A Services node under the Server Group A node lists the services executed by servers belonging to Server Group A. As can be seen, both Service A and Service B are executed by servers belonging to Server Group A. Under the Service A node are a Service A Override A node and a Service A Override B node, which demonstrates that Overrides A and B are associated with Service A. Finally, a Server Group A Servers node lists the servers belonging to Server Group A. In the example illustrated in FIG. 9, Server Group A includes Server A as its member. In addition, Server A includes Server A Override C and Server A Override D as its associated overrides.

Returning to interface component 106, it is further another embodiment of the invention for interface component 106 to perform functions relating to client deployment. In particular, the user may log on to interface component 106 and launch a deployment UI. The deployment UI may graphically display operational states (e.g., in-service or out-of-service) of particular clients located within network 104 as well as relationships among different clients to allow the user to deploy a particular client or group of clients. For example, the user may via the deployment UI mark a client for reinstall. A list of clients marked for reinstall may then be displayed in the deployment UI. Thereafter, the user may select a "deploy" option in the deployment UI to deploy the marked clients. Upon selection of the "deploy" option, a configuration XML object to upgrade the marked clients may be generated, and then the user may be allowed to access a deployment system to deploy the marked clients. After the deployment request is submitted, the deployment UI may provide the user with a status of the deployment request, thus allowing the user to mark a client from a "pending deployment" or "pending refresh" operational state to a "configured" operational state if the deployment is successful or to address a failure in the deployment. In an embodiment of the invention, the deployment UI also allows the user to search a particular client, for example, by client name or a sub-string of client name.

Interface component 106 further allows the user to perform functions relating to transaction management. In particular, the user may launch a schedule management UI allowing the user to view and/or modify a list of scheduled tasks. The schedule management UI may display a list of tasks that are scheduled to be executed or are recently executed as well as status of the tasks (e.g., unscheduled, pending, backlog, percentage completed, executed, failed, or canceled). The user may select a particular task to view detailed information regarding the selected task. After the user selects a particular task, he or she may further modify or cancel the selected task. For example, the user may change the start date and time and/or the effective date and time of the selected task. The user may also change the recurrence data of the selected task. If the user decides to modify or cancel a task, then he or she may need to provide a description of why the modification or cancellation is needed. According to one embodiment of the invention, the user may also via schedule management UI search a task, for example, by using client name or client group name. The result of the search will then be displayed in the schedule management UI.

In another embodiment of the invention, interface component 106 also allows the user to perform functions relating to notification management. In particular, the user may launch a notification task history UI upon logging on to interface component 106. The interface component 106 may then via scriptable API 108 access task status log field 302 of database 102 and obtain a list of tasks being notified to the clients or being executed. The list of tasks is then displayed in the notification task history UI. The user may select a particular task and view detailed information regarding the status of the selected task. For example, this information may indicate how many clients out of the total have been notified of the task. A number of clients that have successfully executed the task and a number of clients that have failed to execute the task may also be provided. And the user may view detailed information on why a failure occurred. In another embodiment of the invention, the user may also search a particular task or set of tasks by using, for example, client name, client group name, start date and time, end date and time, and identification of a user who submitted the task.

User interface component 106 may also support various other functions. For example, it may support monitoring of a client or group of clients. In particular, user interface component 106 may provide a monitoring UI for the user to define a monitoring group and to populate the monitoring group with monitoring servers. The monitoring UI may also allow the user to search and select a particular monitoring server for monitoring one or more individual clients or groups of clients. The monitoring result may then be displayed in the monitoring UI. Interface component 106 may also support security requirement with regard to data stored in database 102. For example, in one embodiment of the invention, interface component 106 is adapted to determine if the requested information is stored in database 102 in encrypted form. If the information is stored in encrypted form, interface component 106 may deny the user access to the information (e.g., not displaying the information). And interface component 106 may deny the user access to certain sensitive and private information (e.g., private information about other users or customers).

APPENDIX A provides specific examples of user scenarios relating to interface component 106.

Scriptable API

In accordance with one embodiment of the invention, interface component 106 is built on top of scriptable API 108. As such, one may also create his or her own interface component on top of scriptable API 108 to provide functions relating to configuration data management. In this embodiment of the invention, scriptable API 108 serves as an interface between interface component 106 and database 102 (and clients within network 104) and allows the user to perform a batch of tasks relating to configuration data management. In particular, scriptable API 108 takes a user command or instruction (such those described herein) entered into interface component 106 and delivers the command or instruction to a configuration data management function for execution. The configuration data management function may be located in database 102 or may be distributed across various components in environment 100. The scriptable API 108 may then receive an output of the command or instruction from the function and return the output to the user via interface component 106. Accordingly, scriptable API 108 and/or other computer-executable instructions constitute means for receiving a request to implement a change in configuration data and means for effecting the change to the configuration data and identifying a plurality of entities affected by the change in response to the received request. Scriptable API 108 and/or other computer-executable instructions also constitute means for receiving data that defines a relationship between an operation of one or more entities in network 104, means for including the defined relationship in topology data, and means for relating the configuration data to an operation of the one or more entities in response to including the defined relationship in the topology data.

As one particular example, scriptable API 108 allows the user to manage a plurality of clients. In particular, the user may enter a request to create a new client (or group of clients) or to define a relationship between different clients in network 104. Scriptable API 108 may then call a function to define the new client or relationship in the topology data stored in database 102. Scriptable API 108 may also call another function to execute configuration data changes needed to implement the entered request. Thereafter, scriptable API 108 may receive the topology data and transfer it to interface component 106 for the user to view or modify the newly created client or the newly defined relationship. In another example, scriptable API 108 may receive a user request to change the operational state of a client, for example, from an "available" operational state to a "pending deployment" operational state. Scriptable API 108 may then call a function to execute configuration data changes needed to implement the received user request. After the operational state of the client is successfully changed, scriptable API 108 may return the resulting operational state of the client to the user via interface component 106.

In one exemplary embodiment of the invention, scriptable API 108 may be divided into three separate programming interfaces to satisfy different needs. For example, an ICCMAccessor interface of scriptable API 108 may model the structure of data (e.g., XML schema) stored in database 102 in order for a user to efficiently access the data. This interface may be needed for the user to effectively correct inaccurate information (e.g., erroneous entity relationship) stored in database 102. An ICCMDesigner interface of scriptable 108 allows the user to construct new data in database 102. The user may utilize the ICCMDesigner interface to build constructs such as objects, object type attributes, property attributes, etc. Finally, an ICCMConfig interface allows the user to perform tasks relating to configuration data management. For instance, the user may utilize this interface to define a relationship between different clients, to identify clients affected by a given configuration data change, to assemble a notification manifest, and to create a notification trigger object for initiating the notification process.

APPENDIX B enumerates exemplary methods of these three programming interfaces as well as their corresponding synopses.

Figure 10A:
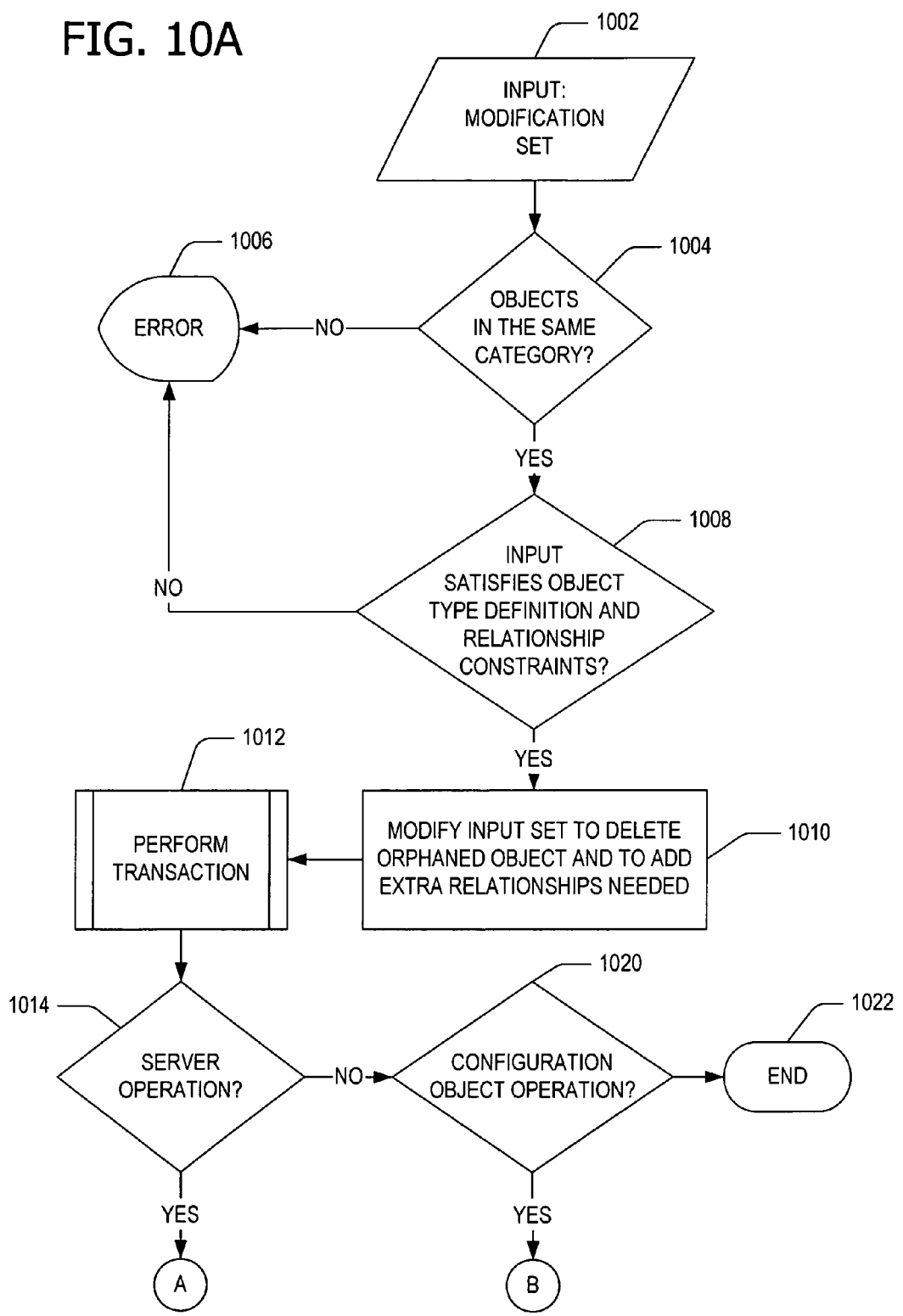
FIGS. 10A and 10B are flow diagrams illustrating exemplary operational flow of a scriptable application programming interface according to one embodiment of the invention.
Figure 10B:
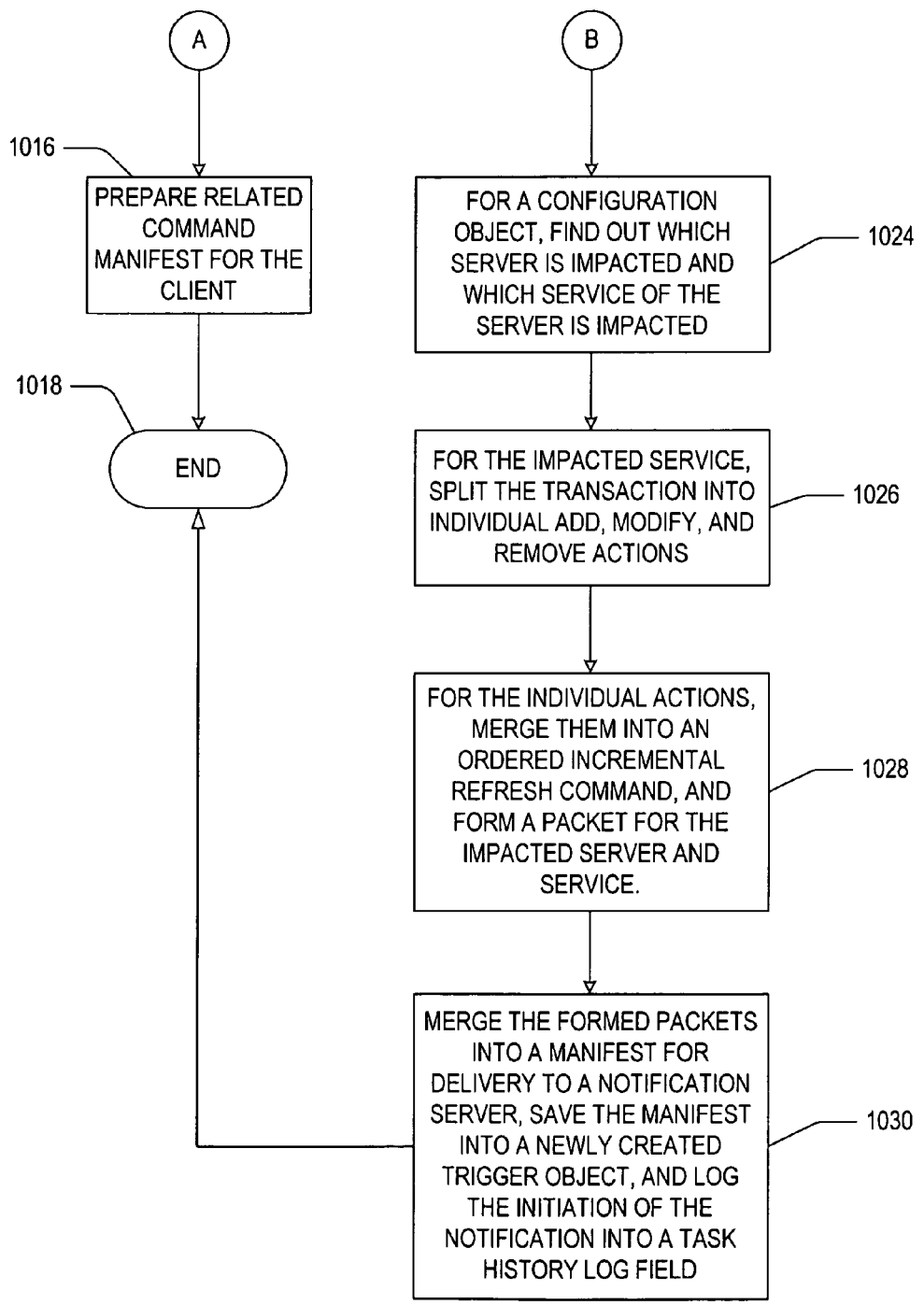

FIGS. 10A and 10B generally illustrate exemplary operations of scriptable API 108 according to one embodiment of the invention. At 1002, scriptable API 108 receives as input a modification set, which may relate to deletion, update, or addition of various properties, relationships, and objects (e.g., a server or a server group). At 1004, scriptable API 108 determines if the objects specified in the input are in the same category. If the specified objects are not in the same category (e.g., one object is a server group and another object is a server), scriptable API 108 at 1006 generates an error message. On the other hand, if the specified objects are in the same category, then scriptable API 108 at 1008 determines if the properties, relationships, and objects specified in the input set satisfy various object type definition and relationship constraints. For example, a specified property should satisfy its property type. And a specified relationship should not violate its constraints (e.g., an OTA_NotificationTarget object type instance may not be assigned to a regular server). If this is not so, then scriptable API 108 at 1006 generates the error message. If the specified properties, relationships, and objects satisfy various constraints, then scriptable API 108 may at 1010 modify the input set to delete orphaned objects and to add extra relationships needed for the input set (e.g., if a server is moved from a server group, relationships between the server and configuration objects of that server group may need to be deleted). Scriptable API 108 may then at 1012 perform the transaction relating to the input set or exit the process if an error message has been generated.

At 1014, scriptable API 108 determines if the transaction is a server operation. If the transaction is a server operation, scriptable API 108 at 1016 may prepare a command manifest for the server, which may include a command to refresh the server cache, to put the server into rotation, etc. At 1018, scriptable API 108 may then end the process. On the other hand, if the transaction is not a server operation, scriptable API 108 at 1020 determines if the transaction is a configuration objects operation. If the transaction is not a configuration object operation, scriptable API 108 at 1022 may end the process. If the transaction is a configuration object operation, scriptable API 108 at 1024 finds out which server and which service of the server are impacted for a particular configuration object. At 1026, scriptable API 108 splits the transaction into individual Add, Modify, and Remove actions for the impacted service. At 1028, scriptable API 108 then merges the individual actions into an ordered incremental Refresh command and forms a packet for the impacted server and service. Scriptable API 108 then at 1030 merges the formed packets into a manifest for delivery to a notification server, saves the manifest into a newly created trigger object, and logs the initiation of the notification into a task status log field (e.g., task status log field 302) of a notification status database. Scriptable API 108 then ends the process at 1018.

Exemplary Programming Interfaces

An interface (such as the scriptable API described herein) in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

Exemplary Operating Environment

Figure 11:
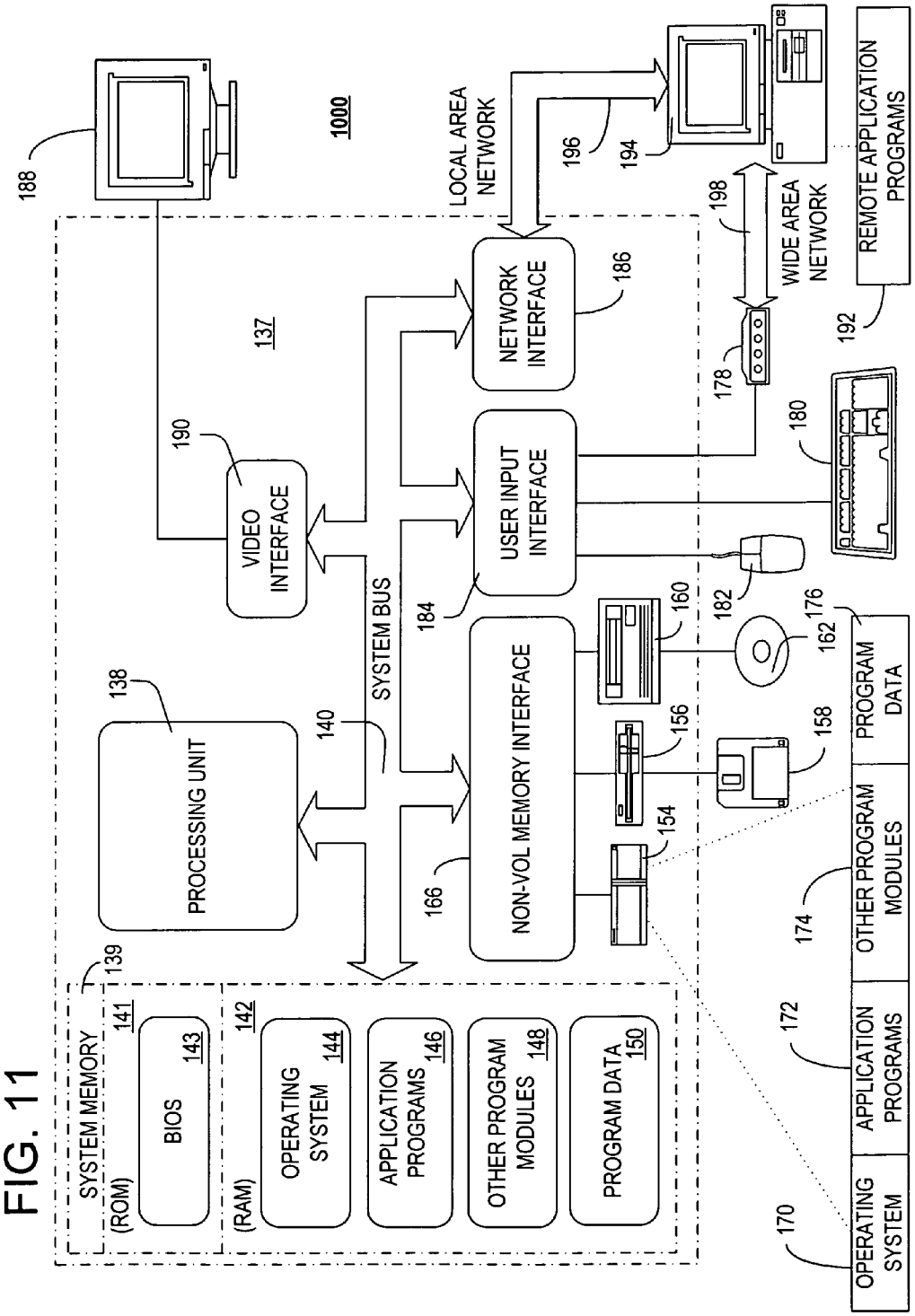
FIG. 11 is a block diagram illustrating an exemplary embodiment of a suitable computing system environment in which one embodiment of the invention may be implemented.

FIG. 11 shows one example of a general purpose computing device in the form of a computer 137. In one embodiment of the invention, a computer such as the computer 137 is suitable for use in interface component 106, clients within network 104, or any other figures illustrated and described herein. Computer 137 has one or more processors or processing units 138 and a system memory 139. In the illustrated embodiment, a system bus 140 couples various system components including the system memory 139 to the processors 138. The bus 140 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 137 typically has at least some form of computer readable media. Computer readable media, which include both volatile and nonvolatile media, removable and non-removable media, may be any available medium that can be accessed by computer 137. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 137. Communication media typically embody computer readable instructions, data structures, program modules, or other data in a modulated data signal such as a carrier wave or other transport mechanism and include any information delivery media. The modulated data signal has one or more of its characteristic set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 139 includes computer storage media in the form of removable and/or non-removable, volatile and/or nonvolatile memory. In the illustrated embodiment, system memory 139 includes read only memory (ROM) 141 and random access memory (RAM) 142. A basic input/output system 143 (BIOS), including the basic routines that help to transfer information between elements within computer 137, such as during start-up, is typically stored in ROM 141. RAM 142 typically includes data and/or program modules that are immediately accessible to and/or presently being operated on by processing unit 138. By way of example, and not limitation, FIG. 11 illustrates operating system 144, application programs 146, other program modules 148, and program data 150.

The computer 137 may also include other removable/non-removable, volatile/nonvolatile computer storage media. For example, FIG. 11 illustrates a hard disk drive 154 that reads from or writes to non-removable, nonvolatile magnetic media. FIG. 11 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 140 by a non-volatile memory interface, such as interface 166.

The drives or other mass storage devices and their associated computer storage media discussed above and illustrated in FIG. 11, provide storage of computer readable instructions, data structures, program modules and other data for the computer 137. In FIG. 11, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 137 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 138 through a user input interface 184 that is coupled to system bus 140, but may be connected by other interface and bus structures, such as a parallel port, game port, or a Universal Serial Bus (USB). A monitor 188 or other type of display device is also connected to system bus 140 via an interface, such as a video interface 190. In addition to the monitor 188, computers often include other peripheral output devices (not shown) such as a printer and speakers, which may be connected through an output peripheral interface (not shown).

The computer 137 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 137. The logical connections depicted in FIG. 11 include a local area network (LAN) 196 and a wide area network (WAN) 198, but may also include other networks. LAN 140 and/or WAN 141 can be a wired network, a wireless network, a combination thereof, and so on. Such network environments are commonplace in offices, enterprise-wide computer networks, intranets, and global computer networks (e.g., the Internet).

When used in a local area network environment, computer 137 is connected to the LAN 196 through a network interface or adapter 186. When used in a wide area network environment, computer 137 typically includes a modem 178 or other means for establishing communications over the WAN 198, such as the Internet. The modem 178, which may be internal or external, is connected to system bus 140 via the user input interface 184, or other appropriate mechanism. In a networked environment, program modules depicted relative to computer 137, or portions thereof, may be stored in a remote memory storage device (not shown). By way of example, and not limitation, FIG. 11 illustrates remote application programs 192 as residing on the memory device. It will be appreciated that the network connections shown are exemplary and other means of establishing a communications link between the computers may be used.

Generally, the data processors of computer 137 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. But it is recognized that such programs and components reside at various times in different storage components of the computer, and are executed by the data processor(s) of the computer.

Although described in connection with an exemplary computing system environment, including computer 137, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a data communication network. In a distributed computing environment, program modules may be located in both local and remote computer storage media including memory storage devices.

In operation, computer 137 executes computer-executable instructions such as those described herein to provide an interface to a function that manages a plurality of entities. Computer-executable instructions receive a request to implement a change in configuration data. The configuration data is stored in a memory area and relates to an operation of one or more entities. In response to the received request, computer-executable instructions identify a plurality of the entities affected by the change and implement the change for the identified plurality of entities in accordance with the function.

Remarks

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "containing," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of embodiments of the invention, it is intended that all matter contained in the above description and shown in the accompanying drawings shall be interpreted as illustrative and not in a limiting sense.

APPENDIX A

The following provides specific examples of user scenarios according to embodiments of the invention.

Taking a Misbehaving Server Out of Rotation

The event-monitoring system has produced an alert. Server A, which hosts Service A, is failing 95% of service requests. John decides to take Server A out of service immediately. A failure percentage this high suggests that Server A is not operating properly. John launches a Console Application from his desktop. The Console Application is an interface component allowing users to perform configuration management functions. After being authenticated with his user credential, the Console Application presents John with the following functions: Client Management, Configuration Data Management, Client Deployment, Transaction Management, and Notification Management. John chooses the Client Management function. From the Client Management view, he searches for the misbehaving server by server name, finds it, and takes it out of service immediately.

Resetting and Scheduling Recurring Jobs

Server B is logging unexpected errors, and the central processing unit (CPU) utilization has risen to 98%. John decides to do a reset hoping that Server B will begin to operate normally. John thus launches the Console Application. After being authenticated, he chooses the Client Management function. From the Client Management view, he searches for the server by server name, locates it, and causes Server B to do a reset.

John discovers a memory leak in a newly deployed service. John wishes to schedule a reset to run in a three-hour interval in order to keep the memory utilization at a reasonable level. John thus launches the Console Application. After being authenticated, he chooses the Client Management function. From the Client Management view, John selects 33% of the servers running the service and chooses the Reset command from the context menu. A confirmation window pops up, with a form to customize the timing of the reset. John chooses to run the first reset immediately, specifies that this is a recurring transaction, and sets the recurrence time to three hours.

Managing Many Servers at Once

A hot fix to an operating system needs to be applied to a number of servers. The hot fix desires a reboot of the servers. The first servers to be upgraded are the authentication servers. Accordingly, John determines that 33% of the authentication servers need to be taken offline so the fix can be applied and smoke-tested. After these servers are upgraded, John may repeat these steps for the remaining 67% of the authentication servers. John thus launches the Console Application. After being authenticated, he chooses the Client Management function. From the Client Management view, he chooses the service class that includes the authentication servers. He then selects the first 100 (out of 300) authentication servers and chooses "Place Out-Of-Service" command.

Organizing Services and Servers Using Server Groups

John can use the Console Application to view the organization of services and servers in separate groups. John can view these relationships in a set of hierarchies. John can also view a group called "Environment Defaults" or "Default Configuration Objects" that includes the global configuration settings. John can choose to override one of the global configuration settings at the server or server group level.

Service A is undergoing a public beta test. As a result, Service A needs to start accepting logging requests at a new URL that will be used for the beta test. The desired change thus maps the HTTP login service on some of the login servers to the URL for the beta test. John also decides to disable other services that are running on the servers hosting the beta test so that the servers may exclusively host the beta test. John thus launches the Console Application. After being authenticated, he chooses the Configuration Data Management function. From the Configuration Data Management view, John selects three servers in the authentication server group, creates a copy of the authentication server group, and names it BT Authentication. BT Authentication has the same properties as the original authentication server group and includes the three servers that John selected. Next, John disabled the services that will not be needed for the beta test and changes the URL of the login service to the URL for the beta test. He repeats these changes for the servers in BT Authentication and then releases the changes. The Console Application builds a list of needed transactions and presents them to John. John reviews the transactions and chooses to commit them without making a change to the scheduling or order. After John presses the "commit" option, the services on the three servers of BT Authentication are taken out of rotation, and the servers are assigned to the new URL for the beta test.

Defining and Releasing Service Configuration Data Changes

A set of configuration data changes is desired for the authentication service. John places a query to determine the affected servers. A collection of servers belonging to groups SOAP3 and SOAP4 is returned. John then decides to smoke test changes on a couple of servers currently in the group SOAP3. He selects three servers from the group SOAP3 and moves them to a group called SOAP3_Smoke, a server group that was pre-created to support the smoke test. After reading a description of the configuration data, John changes the authentication configuration data in the group SOAP3_Smoke. John then reviews the completed configuration data changes.

The Console Application can query the values of a particular server cache from a configuration database. Accordingly, John can use the Console Application to compare the value of a server cached configuration data to the corresponding value in the configuration database.

During the process of testing some new changes, an emergency hot fix needs to be deployed immediately. This hot fix desires some configuration data changes to the registration service. The changes need to be executed in the groups SOAP3 and SOAP3_Smoke. Since the emergency configuration data changes are to be deployed immediately, John decides not to use the group SOAP3_Smoke to smoke test the changes because that would imply rolling out the configuration data changes included in the group SOAP3_Smoke. Instead, he creates a group SOAP3_Smoke-Pri1. The group SOAP3_Smoke-Pri1 is created by selecting two servers from the group SOAP3 and choosing the "smoke test" option of the Console Application. John makes the desired configuration data changes to the group SOAP3_Smoke-Pri1 via the Console Application. After he is satisfied that the smoke test is successful for the group SOAP3_Smoke-Pri1, John chooses to "Accept the Changes" from the group SOAP3_Smoke-Pri1 and to "Discard the Changes" from the group SOAP3_Smoke. Accordingly, the servers are moved back to SOAP3, and they have the configuration settings copied from the group SOAP3_Smoke-Pri1. The end result is that the affected servers (including the servers currently in the smoke test) now have the emergency changes applied to them.

Making Changes Using Environment Defaults (or Default Configuration Objects)

John needs to change the value of certain configuration data to a new value. This change needs to be made for several services and servers in a data center. John thus launches the Console Application. After being authenticated, he chooses the Configuration Data Management function. From the Configuration Data Management view, John opens up "Environment Defaults" or "Default Configuration Objects," locates the configuration data, and changes the value. A warning dialogue pops up to alert John that this default is overridden in some of the server groups. John chooses to delete the overrides and release the change. The result is that the new value for the configuration data has been changed for the servers and services.

Rolling Back a Configuration State

John requests to view the current or past configuration states of a particular server, group of servers, or the network environment in order to troubleshoot issues or to confirm the expected configuration states of one or more configuration objects. After having the network environment running without a problem for over a week after releasing a version of the login service, John decides to describe the current configuration state as a "complete" configuration state as opposed to a "delta" configuration state. John thus launches the Console Application. After being authenticated, he chooses a Rollback function. John selects the current configuration state from a list, and selects the "Mark as Complete" command. From this point on, this particular configuration state can be referred to as a "complete" configuration state.

Shortly after deploying patch #4444, some configuration problems are detected. John decides to rollback the current configuration state (as defined by patch #4444) to the "complete" configuration state. John thus launches the Console Application. After being authenticated, he chooses the "Rollback" function. John selects the target configuration state to and chooses the "rollback" command from the context menu. The Console Application then provides John a Submit Transaction view. The Console Application also displays a warning that Server Group B currently has fewer servers than when the target configuration state was originally released. John thus opens the Client Management function and moves some servers from Server Group A into Server Group B. Then, John presses the "commit" option to commit the rollback. John further returns to the Rollback view to submit a description of why he decided to rollback the configuration state.

Deployment

John needs to upgrade Service A from version one to version two. John thus launches the Console Application. After being authenticated, he chooses the Client Deployment function. Via the Client Deployment function, John brings a number of servers executing Service A offline. He selects the servers that he has taken offline and marks them for a "Reinstall." John then presses the "deploy" option. Upon selection of the "deploy" option, a configuration XML object to upgrade the marked servers is generated, and John launches a deployment system to complete the reinstallation. After the servers have been successfully reinstalled, John places these servers back online via the Console Application.

Repurposing Servers to a New Service Class

Because of the high network traffic on the login service, John decides to move two servers from Server Group A and two servers from Server Group B into Server Group C, which is in a different service class than Server Group A and Server Group B. John thus launches the Console Application. After being authenticated, he chooses the Client Management function to take the four servers from Server Group A and Server Group B out of rotation. He then selects the four servers and moves them into Server Group C. In response, a warning message pops up asking if John really wants to move the servers into a different service class. John confirms his decision and presses the "commit" option. The servers are then marked as "Needing Reinstall." John then opens the Client Deployment view and selects the servers marked as "Needing Reinstall." Upon selection of the "deploy" option, a configuration XML object to upgrade the marked servers is generated, and John launches a deployment system to complete the reinstallation. After the servers have been successfully reinstalled, John places these servers back online via the Console Application.

Scheduling Configuration Data Changes

An unsettling bug is sporadically affecting the creation of profiles, leaving corrupted data in the profile records. A particular debugging configuration value needs to be set so that complete information is gathered whenever this bug shows up again. Since such a setting can affect performance, John decides to set it up during off-peak times. Accordingly, John defines the debugging configuration data changes using the Configuration Data Management function of the Console Application and then presses the "commit" option. He then specifies that the change should begin to run at 9:30 A.M. today and that it is to recur daily.

Scheduling Tasks

John may create new scheduled tasks such as reset, reboot, service restart, etc. via the Console Application. He may further view what scheduled tasks have occurred and what scheduled tasks are still pending.

A problem has occurred for Service A. Accordingly, John wishes to look up the upcoming scheduled tasks via the Console Application in order to cancel or postpone them so that the environment will be in a steady state while he is troubleshooting the problem.

Data Versioning and Staged (Rolling) Upgrade

John needs to upgrade Service E from version one to version two. The first step John performs is to upgrade the back-end servers. During the upgrade of the back-end servers, the configuration settings for version two are entered into a configuration database. But the front-end servers still do not implement the version two settings. Next, John upgrades 33% of the front-end servers to version two. Accordingly, these upgraded servers can now use the version two settings stored in the configuration database and may ignore subsequent updates to the version one settings. John then performs two batch upgrades, 33% of the front-end servers at a time, to complete the upgrade process.

APPENDIX B

The following provides exemplary methods of programming interfaces according to embodiments of the invention.

A. The ICCMAccessor Interface

| Method | Synopsis |
| --- | --- |
| ICCMAccessor: GetMaxLengths | To obtain the maximum allowed length for the fields that accept strings such as EntityName, ObjectName, PropertyName, OTAName, etc. |
| ICCMAccessor: GetMetaNamespaces | To obtain the IDs of the namespaces of the entities. |
| ICCMAccessor: GetRelationshipTypes | To obtain a text/ID map of the relationship types. |
| ICCMAccessor: GetAllowedVarTypes | To obtain possible types allowed for a property (to be used when defining the content of the PropA_DataType). |
| ICCMAccessor: GetNamespaceRelationships | To find allowed relationships as present in the relationship template field. |
| ICCMAccessor: InsertNamespaceRelationships | To insert namespace relationships for one or more object type pairs. This method also sets the many-to-one and one-to-many restrictions. |
| ICCMAccessor: DeleteNamespaceRelationships | To delete namespace relationships for one or more object type pairs. This method disregards the many-to-one and one-to-many restrictions. |
| ICCMAccessor: GenerateNewObjectId | To generate a new entity ID for an entity object. |
| ICCMAccessor: GetEntities | Given the criteria in the input, this method converts the input to the structures needed for the ICCMAccessor and returns the row set of results from the ICCMAccessor. If no result is found, then the result list will be empty. |
| ICCMAccessor: GetProperties | Given the criteria in the input, this method converts the input to the structures needed for the ICCMAccessor and returns the row set of results from the ICCMAccessor. If no result is found, then the result list will be empty. |
| ICCMAccessor: GetRelationships | Given the criteria in the input, this method converts to input to the structures needed for the ICCMAccessor and returns the row set of results from the ICCMAccessor. If no result is found, then the result list will be empty. |
| ICCMAccessor: PerformCcmActions | To perform the actions on given entities, relationships, and properties as specified in a transaction. |

B. The ICCMDesigner Interface

| Method | Synopsis |
| --- | --- |
| ICCMDesigner: Accessor | To get the ICCMAccessor interface. |
| ICCMDesigner: CreateObjectTypeAttribute | To create a new OTA, the name of the OTA should not already be present. |
| ICCMDesigner: DeleteObjectTypeAttribute | To delete an OTA. |
| ICCMDesigner: CreatePropertyAttribute | To create a new Prop, the name of the Prop should not already be present. |
| ICCMDesigner: DeletePropertyAttribute | To delete a Prop. |
| ICCMDesigner: CreatePropertyDefinition | To define a new Prop. |
| ICCMDesigner: GetPropertyDefinition | To get an existing Prop definition. |
| ICCMDesigner: UpdatePropertyDefinition | To update a Prop definition. |
| ICCMDesigner: DeletePropertyDefinition | To delete a Prop definition. |
| ICCMDesigner: CreateObjectTypeDefinition | To define a new object type. |

-continued

B. The ICCMDesigner Interface

| Method | Synopsis |
| --- | --- |
| ICCMDesigner: GetObjectTypeDefinition | To get an existing object type definition. |
| ICCMDesigner: UpdateObjectTypeDefinition | To update an object type definition. |
| ICCMDesigner: DeleteObjectTypeDefinition | To delete an object type definition. |
| ICCMDesigner: CreateInstance | To create an instance of an object type. |
| ICCMDesigner: UpdateInstance | To update an instance of an object type. |
| ICCMDesigner: DeleteInstance | To delete an instance of an object type. |
| ICCMDesigner: GetInstance | To get an instance of an object type. |
| ICCMDesigner: EnumEntitiesByType | To enumerate entities (e.g., OT, OTA, Prop, PropA). |
| ICCMDesigner: RefreshCache | To flush the cache about OT, OTA, Prop, and PropA definitions internal to a library. |
| ICCMDesigner: EnumObjectsByType | To enumerate instances of objects of a given type. |
| ICCMDesigner: BootstrapObjects | To bootstrap object instances. |
| ICCMDesigner: GetObjectTypeAllowedRelationships | To return the allowed relationships in between the specified OT and other OT as per the relationship template field. |
| ICCMDesigner: ModifyObjectTypeAllowedRelationships | To add or delete newly allowed OT to OT relationships in the relationship template field. |
| ICCMDesigner: GetOTAImplementers | To return the names and IDs of OTs that implement a given OTA. |
| ICCMDesigner: GetPropAImplementers | To return the names and IDs of Prop As that implement a given Prop. |
| ICCMDesigner: GetPropertyImplementers | To return the names and IDs of OTs that implement a given Prop. |

C. The ICCMConfig Interface

| Method | Synopsis |
| --- | --- |
| ICCMConfig: TransactObjects | To perform a transaction on the given object set. |
| ICCMConfig: ReadObjects | To read objects that satisfy the input search criteria. |
| ICCMConfig: CheckClaims | To check the permissions for the logged user. |
| ICCMConfig: CheckClaim | To check a single permission for the logged user. |
| ICCMConfig: MarkConfigAsLastKnownGoodState | To mark the current state as a "Last Known Good" or "Complete" configuration state for objects that are in the configuration object category. |
| ICCMConfig: ConfigRollBack | To rollback the configuration object category to the given transaction ID. |
| ICCMConfig: ConfigUndoRollBack | To undo one level of rollback for the configuration object category. |
| ICCMConfig: ConfigRollBackToLastKnownGoodState | To rollback the configuration object category to the "Last Known Good" or "Complete" configuration state. |
| ICCMConfig: ConfigStatesList | To return a list of transactions applied to the configuration object category. |
| ICCMConfig: TaskHistoryLog | To return entries that satisfy the input criteria from the task history log field. |
| ICCMConfig: GetObjectTypeDefinition | To get an existing object type definition. |
| ICCMConfig: GetPropertyDefinition | To get an existing Prop definition. |
| ICCMConfig: Designer | To return the ICCMDesigner interface. |
| ICCMConfig: Accessor | To return the ICCMAccessor interface. |
| ICCMConfig: RefreshCache | To flush the cache about OT, OTA, Prop, and PropA definitions internal to a library. |
| ICCMConfig: GetObjectTypes | To return object types in the entity field. |
| ICCMConfig: ObjectTypeDefinitionSchema | To return the object type definition schema. This schema is used to validate input for CreateObjectTypeDefinition and UpdateObjectTypeDefinition. |
| ICCMConfig: PropertyDefinitionSchema | To return the property definition schema. |
| ICCMConfig: GenerateConfigXMLForInstall | To return the configuration XML for the deployment system. |
| ICCMConfig: GenerateConfigXMLForUninstall | To return the un-installation configuration XML for deployment. |
| ICCMConfig: EnumObjectsByType | To enumerate instances of objects of a given type. |

C. The ICCMConfig Interface

| Method | Synopsis |
| --- | --- |
| ICCMConfig: IssueCommand | To issue a command as specified in the input XML. |
| ICCMConfig: ModifyObjectTypeAttributeValue | To modify an OTA value associated to a given OT. |
| ICCMConfig: ModifyPropertyAttributeValue | To modify a PropA value associated to a given Prop. |

What is claimed is:

1. A method for providing an interface to a function that manages entities, said method comprising:

receiving a request to implement a change for modifying data associated with the entities in a first client device, said each of the entities includes data stored in a data structure representing a topology data of one of the entities in a memory area of the first client device, wherein a name of the each of the entities is stored in an entity namespace field of the data structure and entity data identifying the each of the entities is stored in an entity field of the data structure, said entity data including at least a transaction identifier data representing an entity change transaction and a date/time data indicating a date and time when a transaction represented by the transaction identifier is deleted, wherein the each of the entities includes properties associated therewith, said properties being stored in a property field of the data structure;

in response to the received request, identifying a subset of each of the entities subject to the change based on a relationship data and a relationship type data, said identified subset of each of the entities stores a version of the data included in each of the entities, said relationship data defining a relationship between the entities, said relationship data being stored in a relationship field of the data structure, said relationship type data describing a type of the relationship between an entity and the another entities, said relationship type data being stored in a relationship type field of the data structure, wherein the received request comprises one of the following changes: a rollback request for changing the identified subset from a current configuration state identified by a current transaction identifier to a complete configuration state identified by a previous transaction identifier and a roll-forward request to change the identified subset from the current configuration state to a next configuration state identified by a next transaction identifier, said complete configuration state being represented by a last known good configuration data;

if the received request is the rollback request,
identifying the transaction identifier of the identified subset associated with the complete configuration state;
setting the date/time data associated with the identified transaction to a current date and time if the transaction identifier data of the identified subset is greater than the previous transaction identifier;
appending the current transaction identifier to a transaction stack for the identified subset; and
setting the previous transaction identifier as the current transaction identifier; or if the received request is the roll-forward request, setting the date/time data associated with the identified subset to null if the transaction identifier data of the identified subset is greater than the current transaction identifier but less than a last entry in the transaction stack;
setting the current transaction identifier to that of the last entry in the transaction stack; and
removing the last entry from the transaction stack; and implementing the change to the identified subset in response to the request by modifying the data associated with the identified subset of the one or more entities;

receiving another request, said other request specifying the identified subset of the entities, and wherein said implementing the change in the data comprises implementing the chance in the version of the data associated with the identified subset of the entities, wherein the received other request further specifies a time interval to effect the change in the data stored in the memory area, and wherein said implementing the change in the data comprises effecting the change to the data stored in the memory area in accordance with the specified time interval.

2. The method of claim 1, wherein receiving the request comprises receiving the request from an interface component, and wherein the identified subset of the entities represent the topology data provided to the interface component.

3. The method of claim 1, wherein each of the identified entities stores a version of the data, and further comprising:
changing the version of the data stored by each of the identified entities in accordance wit the function.

4. The method of claim 1, further comprising:
sending the received request to a memory area associated with an authorization service, said authorization service authorizing the received request; and
in response to sending the received request, receiving, from the authorization service, an indication whether the received request is authorized to implement the change in the data.

5. The method of claim 1, further comprising:
receiving data defining a relationship between an operation of the identified entities and the data,
in response to the received data, including the defined relationship in the topology data in accordance with the function, and
wherein as a result of including the defined relationship in the topology data, the data relates to an operation of the identified entities.

6. The method of claim 5, wherein the identified subset of the entities comprise a server included in a server group, said server group executing the service included in a service class, wherein the received data further defines a relationship among the server, the server group, the service class, and the data, and further comprising storing in the memory area the defined relationship among the server, the server group, the service class, and the data as the topology data.

7. The method of claim 1, wherein the received request to implement the change in the data comprises a request to change an operational state of the identified entities, said operational state being defined by the data and indicating whether the identified entities are executing the service.

8. The method of claim 7, further comprising providing the operational state of the identified entity to an interface component in accordance with the function.

9. The method of claim 1, wherein one or more computer storage media have computer-executable instructions, and further comprising executing said computer-executable instructions to perform said receiving, said identifying, and said implementing.

10. One or more computer storage media having stored thereon an application programming interface for managing entities, said application programming interface having computer-executable instructions to:
   receiving a request to implement a change for modifying configuration data associated with the entities in a first client device, said each of the entities includes data stored in a data structure representing a topology data of the one of the entities in a memory area of the first client device, wherein a name of the each of the entities is stored in an entity namespace field of the data structure and entity data identifying the each of the entities is stored in an entity field of the data structure, said entity data including at least a transaction identifier data representing an entity change transaction and a date/time data indicating a date and time when a transaction represented by the transaction identifier is deleted, wherein the each of the entities includes properties associated therewith, said properties being stored in a property field of the data structure;
   in response to the received request, identifying one or more entities subject to the change based on a relationship data and a relationship type data, said identified entities storing a version of the configuration data, said relationship data defining a relationship between the entities, said relationship data being stored in a relationship field of the data structure, said relationship type data describing a type of the relationship between an entity and the another entities, said relationship type data being stored in a relationship type field of the data structure, wherein the received request comprises one of the following changes: a rollback request for changing the identified entities from a current configuration state identified by a current transaction identifier to a complete configuration state identified by a previous transaction identifier and a roll-forward request to change the identified entities from the current configuration state to a next configuration state identified by a next transaction identifier, said complete configuration state being represented by a last known good configuration data;
   if the received request is the rollback request,
      identifying the transaction identifier of the identified entities associated with the complete configuration state;
      setting the date/time data associated with the identified transaction to a current date and time if the transaction identifier data of the identified entities is greater than the previous transaction identifier;
      appending the current transaction identifier to a transaction stack for the identified entities; and
      setting the previous transaction identifier as the current transaction identifier; or if the received request is the roll-forward request,
      setting the date/time data associated with the identified entities to null if the transaction identifier data of the identified entities is greater than the current transaction identifier but less than a last entry in the transaction stack;
      setting the current transaction identifier to that of the last entry in the transaction stack; and
      removing the last entry from the transaction stack; and
   implementing the change to the identified entities in response to the request by modifying the configuration data associated with the identified entities;
   wherein the application programming interface further comprises computer-executable instructions to receive another request, said other request specifying the identified entities, and implement the change in the version of the configuration data associated with the identified entities, wherein the received other request further specifies a time interval to effect the change in the configuration data stored in the memory area, and wherein the implementing the change in the configuration data comprises effecting the change in the configuration data stored in the memory area in accordance with the specified time interval.

11. The computer storage media of claim 10, wherein the computer-executable instructions are further adapted to:
   receive data defining a relationship between an operation of the identified entities and the configuration data;
   including the defined relationship in the topology data in response to the received data; and
   wherein as a result of including the defined relationship in the topology data, the configuration data relates to an operation of the identified entities.

12. The computer storage media of claim 11, wherein the identified entities comprise a server included in a server group, said server group executing the service included in a service class, wherein the received data further defines a relationship among the server, the server group, the service class, and the configuration data, and wherein the computer-executable instructions are further adapted to store in the memory area the defined relationship among the server, the server group, the service class, and the configuration data as the topology data.

13. The computer storage media of claim 10, wherein the received request to implement the change in the configuration data comprises a request to change the identified entities from an existing configuration state to a previous configuration state, said existing configuration state represented by existing configuration data, said previous configuration state represented by previous configuration data, and wherein the change in the configuration data represents a change from the existing configuration data to the previous configuration data.

14. A system for managing a plurality of entities, said system comprising:
   a memory area for storing configuration data defining an operation for executing a service by one or more of the entities, said memory area further storing topology data describing at least the following information: a name of each of the entities, entity data identifying the each of the entities, said entity data including at least a transaction identifier data representing an entity change transaction and a date/time data indicating a date and time when a transaction represented by the transaction identifier is deleted, relationship data defining a relationship between the entities, and a relationship type data describing a type of the relationship between an entity and the another entities; and a processor configured to execute computer-executable instructions for:
- receiving a request to implement a change in the configuration data;
- identifying a plurality of the entities affected by the change in response to the received request as a function of the topology data, said identified plurality of the entities storing a version of the configuration data, wherein the received request comprises one of the following changes: a rollback request for changing the identified entities from a current configuration state identified by a current transaction identifier to a complete configuration state identified by a previous transaction identifier and a roll-forward request to change the identified entities from the current configuration state to a next configuration state identified by a next transaction identifier, said complete configuration state being represented by a last known good configuration data; if the received request is the rollback request,
  - identifying the transaction identifier of the identified entities associated with the complete configuration state;
  - setting the date/time data associated with the identified transaction to a current date and time if the transaction identifier data of the identified entities is greater than the previous transaction identifier;
  - appending the current transaction identifier to a transaction stack for the identified entities; and
  - setting the previous transaction identifier as the current transaction identifier; or if the received request is the roll-forward request,
  - setting the date/time data associated with the identified entities to null if the transaction identifier data of the identified entities is greater than the current transaction identifier but less than a last entry in the transaction stack;
  - setting the current transaction identifier to that of the last entry in the transaction stack; and
  - removing the last entry from the transaction stack; and
- implementing the change for the identified plurality of entities by modifying the configuration data associated with the identified plurality of entities;

wherein the processor further receives another request, said received other request specifying the identified entities, and the processor implements the change in the version of the configuration data associated with the identified entities, said received other request specifying a time interval to effect the change in the configuration data stored in the memory area, and wherein the processor implements the change in the configuration data stored in the memory area in accordance with the specified time interval.

15. The system of claim 14, wherein the processor is further configured to execute computer-executable instructions for:
- receiving data defining a relationship between an operation of the identified entities and the configuration data,
- including the defined relationship in the topology data in response to the received data, and
- relating the configuration data to an operation of the identified entities in response to including the defined relationship in the topology data.

16. The method of claim 1, wherein the first client is a server included in a server group, said server group executing a service included in a service class, wherein the relationship field stores data indicating a relationship among the server, the server group, the service class, and the configuration data.

17. The method of claim 1, further comprising storing data representing a formation of the relationship in a relationship template field of the data structure.

18. The method of claim 1, wherein the namespace field stores data representing one of more of the following entity namespaces: an object type namespace storing data representing an object type, an object namespace storing data identifying an instance of the object type, a property namespace storing data defining the object type, and a property attribute namespace storing data defining a property of the object type.

19. The method of claim 1, wherein said relationship type field stores data representing one or more of the following entity relationship types: is an attribute of an object type, is a property of an object type, has all attributes of an object type, has all properties of an object type, is an attribute of a property, has all attributes of a property, is an instance of an object type, is a child of an object, and is associated with an object.

20. The method of claim 1, further comprising storing data for tracking a task to manage a plurality of clients in a second data structure, said storing comprises storing at least the following in the second data structure:
- a processed task field storing data specifying a task being processed, and
- a task status log field storing data representing a stats log of the specified task.

21. The method of claim 20, further comprising storing one of the following in the second data structure:
- a task status field derived from the task status log field by indicating a current status of the specified task included in the task status log field, and
- a task status type field derived from the task status log field by indicating a type of the specified task included in the task status log field.

* * * * *

UNITED STATES PATENT AND TRADEMARK OFFICE
CERTIFICATE OF CORRECTION

PATENT NO. : 7,590,669 B2  Page 1 of 1
APPLICATION NO. : 10/819834
DATED : September 15, 2009
INVENTOR(S) : Yip et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,590,669 B2 | Page 1 of 1 |
| APPLICATION NO. | : 10/819834 | |
| DATED | : September 15, 2009 | |
| INVENTOR(S) | : Ying-Kin Tony Yip et al. | |

It is certified that error appears in the above-identified patent and that said Letters Patent is hereby corrected as shown below:

In column 37, lines 66-67, in Claim 1, delete "if the received request is the roll-forward request," and insert the same on Col. 37, line 67 as the new indentation in the Claim.

In column 38, line 28, in Claim 1, delete "chance" and insert -- change --, therefor.

In column 38, line 43, in Claim 3, delete "wit" and insert -- with --, therefor.

In column 40, lines 2-3, in Claim 10, delete "if the received request is the roll-forward request," and insert the same on Col. 40, line 3 as the new indentation in the Claim.

In column 41, lines 21-22, in Claim 14, delete "if the received request is the rollback request," and insert the same on Col. 41, line 22 as the new indentation in the Claim.

In column 41, lines 33-34, in Claim 14, delete "if the received request is the roll-forward request," and insert the same on Col. 41, line 34 (Approx,) as the new indentation in the Claim.

In column 41, line 47, in Claim 14, delete "request." and insert -- request, --, therefor.

In column 42, line 23, in Claim 18, delete "of" and insert -- or --, therefor.

In column 42, line 43, in Claim 20, delete "stats" and insert -- status --, therefor.

Signed and Sealed this
Twenty-first Day of June, 2011

David J. Kappos
*Director of the United States Patent and Trademark Office*